United States Patent
Linnen et al.

(10) Patent No.: US 12,032,959 B2
(45) Date of Patent: Jul. 9, 2024

(54) NON-VOLATILE MEMORY DIE WITH LATCH-BASED MULTIPLY-ACCUMULATE COMPONENTS

(71) Applicant: Western Digital Technologies, Inc., San Jose, CA (US)

(72) Inventors: Daniel Joseph Linnen, Naperville, IL (US); Ramanathan Muthiah, Bangalore (IN); Kirubakaran Periyannan, Saratoga, CA (US)

(73) Assignee: Western Digital Technologies, Inc., San Jose, AZ (US)

( * ) Notice: Subject to any disclaimer, the term of this patent is extended or adjusted under 35 U.S.C. 154(b) by 0 days.

(21) Appl. No.: 17/847,039

(22) Filed: Jun. 22, 2022

(65) Prior Publication Data
US 2023/0418600 A1  Dec. 28, 2023

(51) Int. Cl.
*G06F 9/30* (2018.01)
*G06F 9/345* (2018.01)
*G06F 15/78* (2006.01)
*G06F 7/544* (2006.01)
*G06N 3/063* (2023.01)

(52) U.S. Cl.
CPC .......... *G06F 9/3001* (2013.01); *G06F 9/3004* (2013.01); *G06F 9/30098* (2013.01); *G06F 9/345* (2013.01); *G06F 15/7821* (2013.01); *G06F 7/5443* (2013.01); *G06N 3/063* (2013.01)

(58) Field of Classification Search
CPC .. G06F 9/3001; G06F 9/3004; G06F 9/30098; G06F 9/345; G06F 15/7821; G06F 7/5443; G06N 3/063
See application file for complete search history.

(56) References Cited

U.S. PATENT DOCUMENTS

| | | |
|---|---|---|
| 5,050,095 A | 9/1991 | Samad |
| 7,313,550 B2 | 12/2007 | Kulkarni et al. |
| 8,345,295 B2 | 1/2013 | Kim |

(Continued)

FOREIGN PATENT DOCUMENTS

CN  113516172 A  10/2021

OTHER PUBLICATIONS

Soliman et al.; A Ferroelectric FET Based In-memory Architecture for Multi-Precision Neural Networks; IEEE; 2020 (Year: 2020).*

(Continued)

*Primary Examiner* — Corey S Faherty
(74) *Attorney, Agent, or Firm* — LOZA & LOZA, LLP; Gabriel Fitch

(57) ABSTRACT

Latch-based multiply-accumulate (MAC) operations implemented on the die of a non-volatile memory (NVM) array are disclosed. The exemplary latch-based MAC procedures described herein are linear procedures that do not require logic branches. In one example, the MAC operation uses a set of linear MAC stages, wherein each linear stage processes MAC operations corresponding to one bit of a first multi-bit multiplicand being multiplied against a second multi-bit multiplicand. Examples are provided wherein the MAC procedures are performed as part of a neural network feedforward procedure where the first multiplicand is a synaptic weight and the second multiplicand is an activation value. Multiple plane and multiple die NVM array implementations are also described for massive parallel processing.

24 Claims, 10 Drawing Sheets

(56) References Cited

U.S. PATENT DOCUMENTS

| | | | |
|---|---|---|---|
| 9,239,691 | B2 | 1/2016 | Lam |
| 9,336,483 | B1 | 5/2016 | Abeysooriya et al. |
| 9,875,440 | B1 | 1/2018 | Commons |
| 10,180,820 | B2 | 1/2019 | Buchanan et al. |
| 10,356,320 | B2 | 7/2019 | Shirota et al. |
| 10,552,936 | B2 | 2/2020 | Li |
| 11,064,194 | B2 | 7/2021 | Muthiah |
| 11,544,037 | B2 * | 1/2023 | Chakraborty ............ G06G 7/16 |
| 2011/0222735 | A1 | 9/2011 | Mai et al. |
| 2019/0311267 | A1 | 10/2019 | Qin et al. |
| 2020/0097807 | A1 | 3/2020 | Knag et al. |
| 2020/0117539 | A1 | 4/2020 | Sun et al. |
| 2020/0134443 | A1 | 4/2020 | Qin |
| 2020/0184335 | A1 | 6/2020 | Rom et al. |
| 2021/0089390 | A1 * | 3/2021 | Lee ..................... G06F 11/1048 |
| 2021/0096751 | A1 | 4/2021 | Berman et al. |
| 2021/0110244 | A1 | 4/2021 | Hoang et al. |
| 2021/0304009 | A1 | 9/2021 | Bazarsky et al. |
| 2021/0312959 | A1 | 10/2021 | Shan et al. |

OTHER PUBLICATIONS

Zhang et al.; A Robust 8-Bit Non-Volatile Computing-in-Memory Core for Low-Power Parallel MAC Operations; IEEE; 2020 (Year: 2020).*

Zhi et al.; Opportunities and Limitations of in-Memory Multiply-and-Accumulate Arrays; IEEE; 2021 (Year: 2021).*

Kim, Minsu, "Non-Volatile Neuromorphic Computing based on Logic-Compatible Embedded Flash Memory Technology", University of Minnesota's Digital Conservancy; Jul. 2020; https://conservancy.umn.edu/handle/11299/216877; 3 pages.

Lee, Sung-Tae et al., "Neuromorphic Computing Using NAND Flash Memory Architecture With Pulse Width Modulation Scheme", Frontiers in Neuroscience: Neuromorphic Engineering; Sep. 18, 2020; https://www.frontiersin.org/articles/10.3389/fnins.2020.571292; 9 pages.

Shim, Wonbo et al., "Architectural Design of 3D NAND Flash based Compute-in-Memory for Inference Engine", MEMSYS 2020: The International Symposium on Memory Systems; Sep. 2020; https://dl.acm.org/doi/10.1145/3422575.3422779; 3 pages.

Wang, Yin et al., "An in-memory computing architecture based on two-dimensional semiconductors for multiply- accumulate operations", Nature Communications; Jun. 7, 2021; https://www.nature.com/articles/s41467-021-23719-3; 28 pages.

Amirsoleimani, Amirali et al., "In-Memory Vector-Matrix Multiplication in Monolithic Complementary Metal-Oxide- Semiconductor-Memristor Integrated Circuits: Design Choices, Challenges, and Perspectives", Advanced Intelligent Systems; vol. 2, Issue 11; Aug. 23, 2020; https://onlinelibrary.wiley.com/doi/full/10.1002/aisy.202000115; 48 pages.

Haj-Ali, Ameer et al., "IMAGING: In-Memory AlGorithms for Image processiNG", IEEE Transactions on Circuits and Systems I: Regular Papers; vol. 65, Issue 12; Dec. 2018; https://ieeexplore.ieee.org/document/8398398; 14 pages.

Zhang, Jintao et al., "In-Memory Computation of a Machine-Learning Classifier in a Standard 6T SRAM Array", IEEE Journal of Solid-State Circuits; vol. 52, Issue 4; Apr. 2017; https://ieeexplore.ieee.org/abstract/document/7875410; 10 pages.

"An On-device Deep Neural Network for Face Detection", Apple Machine Learning Research; Nov. 2017; https://machinelearning.apple.com/research/face-detection; 10 pages.

Kim, Sung et al., "MATIC: Learning Around Errors for Efficient Low-Voltage Neural Network Accelerators", 2018 Design, Automation & Test in Europe Conference & Exhibition; Mar. 19-23, 2018; https://ieeexplore.IEEE.org/document/8341970; 6 pages.

Tsai, Li-Huang et al., "Robust Processing-In-Memory Neural Networks via Noise-Aware Normalization", Nov. 24, 2020; https://arxiv.org/pdf/2007.03230.pdf; 7 pages.

He, Ruiquan et al., "Artificial Neural Network Assisted Error Correction for MLC NAND Flash Memory", Aug. 2021; https://www.ncbi.nlm.nih.gov/pmc/articles/PMC8398337; 19 pages.

Sraw, Jashanpreet Singh et al., "Using Convolutional Neural Networks for fault analysis and alleviation in accelerator systems", Dec. 5, 2021; https://arxiv.org/abs/2112.02657; 8 pages.

Ozen, Elbruz et al., "Low-Cost Error Detection in Deep Neural Network Accelerators with Linear Algorithmic Checksums", Journal of Electronic Testing; Jan. 6, 2021; https://link.springer.com/article/10.1007/s10836-020-05920-2; 16 pages.

Wang, Chen et al., "Neural network based silent error detector", 2018 IEEE International Conference on Cluster Computing; Sep. 10-13, 2018; https://ieeexplore.ieee.org/document/8514878; 10 pages.

Xiao, Patrick T. et al., "Analog architectures for neural network acceleration based on non-volatile memory", Applied Physics Reviews 7; Jul. 9, 2020; 35 pages <https://aip.scitation.org/doi/10.1063/1.5143815>.

Hasan, Mehedi et al., "Reliability of NAND Flash Memory as a Weight Storage Device of Artificial Neural Network", IEEE Transactions on Device and Materials Reliability; vol. 20, Issue 3; Sep. 2020; 8 pages <https://ieeexplore.ieee.org/document/9149916>.

Resch, Salonik et al., "PIMBALL: Binary Neural Networks in Spintronic Memory", ACM Transactions on Architecture and Code Optimization; vol. 16, No. 4, Article 41; Oct. 2019; 26 pages <https://arxiv.org/pdf/1812.03989.pdf>.

Mizushina, Keita et al., "Layer-by-layer Adaptively Optimized ECC of NAND flash-based SSD Storing Convolutional Neural Network Weight for Scene Recognition", 2018 IEEE International Symposium on Circuits and Systems (ISCAS), May 27-30, 2018; 5 pages <https://ieeexplore.ieee.org/abstract/document/8351440>.

* cited by examiner

NON-VOLATILE MEMORY DIE WITH LATCH-BASED MULTIPLY-ACCUMULATE COMPONENTS

FIELD

The disclosure relates, in some embodiments, to non-volatile memory (NVM) arrays. More specifically, but not exclusively, the disclosure relates to methods and apparatus for implementing a latch-based multiple-accumulate (MAC) unit on an NVM die.

INTRODUCTION

Deep learning (which also may be referred to as deep structured learning or hierarchical learning) relates to machine learning methods based on learning data representations or architectures, such as deep neural networks (DNNs), rather than to task-specific procedures or algorithms. Deep learning is applied to such fields as speech recognition, computer vision, and self-driving vehicles. Deep learning may be accomplished by, or facilitated by, deep learning accelerators (DLAs), e.g., microprocessor devices designed to accelerate the generation of useful neural networks to implement deep learning. At least some DLAs perform multiply-accumulate (MAC) operations on neural network data, such as during feedforward computations. MAC operations are often needed for other computations as well, such as for performing convolutions. It would be desirable to provide more efficient mechanisms for performing MAC operations, particularly for implementing on a non-volatile memory (NVM) die that includes a set of latches for bit manipulation and temporary storage.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a device that includes: a non-volatile memory (NVM) array formed on a die; a storage register formed on the die; a set of latches formed on the die; and processing circuitry formed on the die and configured to: obtain data from the NVM array; and perform a multiply-accumulate (MAC) operation on the data using the register and the set of latches, wherein the MAC operation is performed using linear processing.

Another embodiment of the disclosure provides a method for use with a device comprising an NVM array formed on a die. The method comprising: reading data from the NVM array into at least one latch of a plurality of latches formed on the die; and perform a MAC operation on the data using a register formed on the die and the set of latches formed on the die, wherein the MAC operation is performed using linear processing.

Yet another embodiment of the disclosure provides a device that includes: a memory formed on a die; a storage register formed on the die; a set of latches formed on the die; and processing circuitry formed on the die and configured to: obtain data from the memory; and perform a MAC operation on the data using the register and the set of latches, wherein the MAC operation is performed using linear processing. The memory formed on the die may be a volatile memory or an NVM.

Still yet another embodiment of the disclosure provides an apparatus for use with a device comprising an NVM array formed on a die. The apparatus includes: means for reading data from the NVM array into at least one latch of a plurality of latches formed on the die; and means for perform a MAC operation on the data using a storage register formed on the die and the plurality of latches formed on the die, wherein the MAC operation is performed using linear processing.

DETAILED DESCRIPTION

Figure 1:
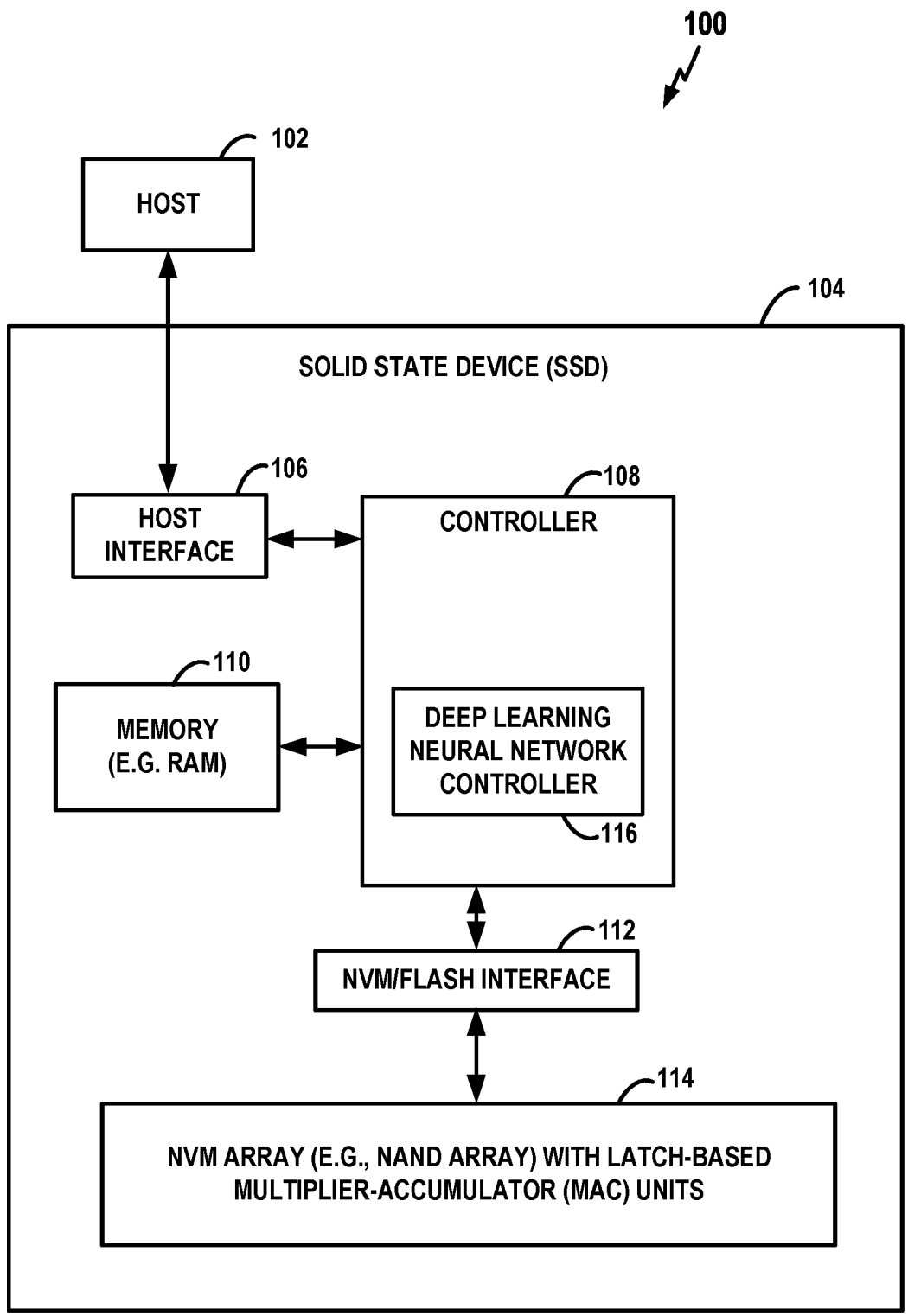
FIG. 1 shows a schematic block diagram configuration for an exemplary solid state device (SSD) according to aspects of the present disclosure having one or more non-volatile memory (NVM) array dies, where the dies have latch-based multiply-accumulate (MAC) units.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays, and to data storage devices or apparatus for controlling the NVM arrays, such as a controller of a data storage device (such as an SSD), and in particular to NAND flash memory storage devices (herein "NANDs"). (A NAND is a type of non-volatile storage technology that does not require power to retain data. It exploits negative-AND, i.e., NAND, logic.) For the sake of brevity, an SSD having one or more NAND dies will be used below in the description of various embodiments. It is understood that at least some aspects described herein may be applicable to other forms of data storage devices as well. For example, at least some aspects described herein may be applicable to phase-change memory (PCM) arrays, magneto-resistive random access memory (MRAM) arrays and resistive random access memory (ReRAM) arrays, at least if such devices are equipped with suitable latches for implementing operations discussed herein. In addition to data storage devices, the NVM arrays and associated circuitry and latches in various described embodiments may be implemented as part of memory devices such as dual in-line memory modules (DIMMs) or other types of memory components/modules in some embodiments. Such memory devices may be accessible to a processing component such as a Central Processing Unit (CPU) or a Graphical Processing Unit (GPU). The links between processing components to such memory devices may be provided via one or more memory or system buses, including via interconnects such as Compute Express Link (CXL), Gen-Z, OpenCAPI, NVLink/NVSwitch, Infinity Fabric, Omni-Path and other similar interconnect protocols. In other embodiments, the links between processing components to memory devices may be provided via on-die or die-to-die interconnects. In certain embodiments the NVM arrays and associated circuitry and latches may be co-located on the same die as such processing components such as CPU or GPU.

Overview

As noted above, deep learning may be accomplished by, or facilitated by, deep learning accelerators (DLAs), e.g., microprocessor devices designed to accelerate the generation of deep neural networks (DNNs) to implement deep learning. These networks may also be referred to as learning networks. At least some DLAs perform multiply-accumulate (MAC) operations on neural network data, such as during feedforward computations.

Herein, methods and apparatus are disclosed for performing MAC operations on the die of an NVM using one or more latches. A MAC operation (sometimes referred to as a multiply-add (MAD) operation) computes the product of two numbers and adds the product to an accumulator. Mathematically, the operation may be represented as (b×c)+y→y where b and c are two multiplicands and y is the accumulator. (An accumulator is often represented using the letter a. However, herein, a is used to refer to an activation neural network value.) As will be explained, the latch-based MAC operations presented herein are performed using linear processing on the latches without decision branches to provide a high-speed linear processing flow. In other embodiments, at least some decision branches can be included in the process flow. A volatile memory register is used as the accumulator. The linear latch-based operations can be exploited to utilize massively-parallel capabilities within NAND NVM arrays for simple bit manipulation and pattern propagation to accelerate the computation of MAC functions to facilitate in-memory computing. Although MAC operations for use with a DLA of a DNN are used as primary examples, the latch-based MAC units described herein are also useful in other in-memory computing systems, such as systems for performing convolutions.

Note that a DNN is an example of an artificial neural network that has multiple layers between input and output layers. A DNN operates to determine a mathematical computation or manipulation to convert the input into the output, which might be a linear or non-linear computation. For example, the DNN may work through its layers by calculating a probability of each output. Each mathematical manipulation may be considered a layer. Networks that have many layers are referred to as having "deep" layers, hence the term DNN. In one particular example, the DNN might be configured to identify a person within an input image by processing the bits of the input image to yield identify the person, i.e., the output of the DNN is a value that identifies the particular person.

DNNs are often configured as feedforward networks, in which data flows from an input layer to an output layer in one direction. Initially, the DNN may generate a map of virtual "neurons" and assign initial numerical values or "weights" to connections between the neurons. The weights and inputs are multiplied to return output values between, e.g., 0 and 1. The weights may be adjusted in an attempt to improve the accuracy by which the network relates its input to a known output (to, for example, correctly identified an input image).

In one aspect of a DLA of a DNN, a feedforward computation for a single neuron activation in DNN is given by Equation 1 below, where MAC operations using synaptic weights are summed and then an activation function is calculated, which is often a maximum function (such as a rectifier linear activation function computed by a rectifier linear unit (RLU or ReLU)) or a sigmoid function. That is, in some examples, the feedforward computation involves a sum over weights (w) multiplied by input values (a) to each neuron in the network plus a bias value (b), the result of which is then applied to a sigmoid activation function (σ) to yield the next value in the network.

$$a_j^l = \sigma\left(\sum_k w_{jk}^l a_k^{l-1} + b_j^l\right) \quad (1)$$

In Equation 1, $w_{jk}^l$, denotes the weight for a connection from a $k^{th}$ neuron (or node) of the neural network) in an $(l-1)^{th}$ layer of the neural network to a $j^{th}$ neuron in an $l^{th}$ layer. The term $b_j^l$ denotes a bias of the $j^{th}$ neuron in the $l^{th}$ layer and $a_j^l$ denotes the activation of the $j^{th}$ neuron in the $l^{th}$ layer. Thus, the activation $a_j^l$ of the $j^{th}$ neuron in the $l^{th}$ layer is related to the activations in the $(l-1)^{th}$ layer. Note also that in Equation 1 the sum is over all neurons k in the $(l-1)^{th}$ layer. That is, for each layer, the weight w of each of the k neurons in the layer is multiplied by a corresponding activation value for the neuron, the values of this intermediate computation are summed together. This is the aforementioned MAC operation which multiplies individual w and a values and then accumulates (i.e., sums) the results. The appropriate bias value b is then added to the output of the MAC and result is applied to the sigmoid activation function (σ) to obtain the next activation value a. Note also that the zeroth layer of the neural network may be referred to as the input layer, the first layer of the neural network may be referred to as the first hidden layer, and the final layer of the neural network may be referred to as the output layer.

DLA learning schemes may be based on solving backpropagation equations to update the network weights (w). Exemplary backpropagation equations are based on weighted sums using calculated δ terms (in the equations below in a matrix and vector form) for the output and so-called hidden layer neurons in the DNN (i.e., the intermediate layers between the input layer and the output layer) and wherein training values are employed.

Briefly, a cost function C may be defined:

$$C = \frac{1}{2n}\sum_x \|y(x) - a^L(x)\|^2 \quad (2)$$

where n is a total number of training examples x, the sum is over individual training examples, x; y=y(x) is a corresponding desired output (e.g., a known output); L denotes the number of layers in the network; and $a^L=a^L(x)$ is a vector of activations output from the neural network when x is input.

Error values δ may be defined based on the cost function and a weighted input values z:

$$\delta_j^l \equiv \frac{\partial C}{\partial z_j^l}. \quad (3)$$

where $\delta_j^l$ is the error of a neuron j in a layer l and where $z_j^l$ is a weighted input for the neuron j in the layer l. It is noted that the error $\delta_j^l$ is equal to a rate of change of C relative to the bias value b for the jth neuron of the lth layer, e.g.:

$$\frac{\partial C}{\partial b} = \delta \quad (4)$$

where δ is evaluated at the same neuron as the bias b.

Four main backpropagation equations may then be defined:

$$\delta^L = \nabla_a C \odot \sigma'(z^L) \quad (5)$$

$$\delta^l = ((w^{l+1})^T \delta^{l+1}) \odot \sigma'(z^l) \quad (6)$$

$$\frac{\partial C}{\partial b_j^l} = \delta_j^l \quad (7)$$

$$\frac{\partial C}{\partial \omega_{jk}^l} = a_k^{l-1} \delta_j^l \quad (8)$$

As these are standard backpropagation equations, they will not be described in detail herein, other than to note that the T of Eq. (6) indicates a matrix transpose, the σ' of Eq. (6) denotes a derivative of the sigmoid function σ, and the symbol ⊙ denotes a Hadamard product, i.e., an elementwise product of two vectors.

Based on these equations (or, in some cases, other standard backpropagation equations), the synaptic weights w of the DNN may be updated based on a desired output of the neural network y=y(x) provided by the user, which may be input for training purposes and used in conjunction with the existing bias values b, weights w and activation values a already stored. For example, the desired outputs, y(x), sometimes called in the literature "learning labels" or "learning targets" of a supervised learning scheme may be provided by the user/host device to the DLA NAND.

For complex DNNs—especially massive DNNs with many layers—the computation of the many feedforward values and the backpropagation values can be time consuming. Hence, it would be desirable to provide a high performance DNN system configured for massive parallel neural network processing that is fast, efficient and consumes low power. Performing latch-based MAC operations at high speed and using low power helps achieve this goal.

Thus, some aspects disclosed herein relate to performing MAC operations using latches, wherein the MAC operation performed using linear processing, e.g., without decision branches. In some examples, additional processing circuitry may be provided in the form of under-the-array (or next-to-the-array) components of a NAND die, e.g., to implement other feedforward neural network operations and computations and/or to implement backpropagation operations and computations. Thus, in some examples, a high performance DNN system is disclosed that includes flash NAND dies with latch-based MACs. In some examples, the aforementioned feedforward MAC operations, e.g., the weighted sum of Eq. 1, are implemented by a NAND die for a very large number of neuron cells in parallel (e.g., ~4000 cells per die plane) with no need to transfer the stored weights data to the NAND controller or to a host device. The aforementioned backpropagation operations also may be implemented by the NAND die without the need to transfer adjusted weights data to the NAND controller or to the host device. That is, in some examples, the learning backpropagation equations used for training the DLA of the NAND die are performed by under-the-array components NAND die.

Although described with reference to latches, it should be understood that other equivalent devices may be used, such as data storage registers. Generally speaking, a latch may be a circuit with states for storing information. In some aspects, the latch is a flip-flop circuit for storing two states. A latch may be referred to as a data storage element and may store a plurality of bits of data where each bit is in one of two states: either 0 or 1. In other aspects, a latch may be a memory unit with two or more states. In some aspects, a latch may be referred to as a cache memory and may be configured as a memory element for temporarily holding data. Latches are typically volatile memory devices (even when implemented as a component on an NVM die). However, a latch might be implemented as a NVM device (although that would typically be too slow for practical use). Further, although described primarily with reference to NVM arrays, aspects of the disclosure apply to volatile memory chips as well.

Exemplary SSD Implementation of Latch-Based Parity Detection and Trimming

FIG. 1 is a block diagram of a system 100 including an exemplary SSD having an NVM with latch-based MAC units in accordance with aspects of the disclosure. The NVM array may also include various on-chip deep learning DLA components. The system 100 includes a host 102 and an SSD 104 coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may a computing device, a personal computer, a portable computer, a workstation, a server, a personal digital assistant, a digital camera, or a digital phone as merely a few examples. Additionally or alternatively, the host 102 may be a system or device having a need for neural network processing, such as speech recognition, computer vision, and self-driving vehicles. For example, the host 102 may be a component of a self-driving system of a vehicle.

The SSD 104 includes a host interface 106, a controller 108, a memory 110 (such as a random access memory (RAM)), an NVM interface 112 (which may be referred to as as a flash interface), and an NVM 114, such as one or more NAND dies. The NVM 114 may be configured with latch-based MAC units. The host interface 106 is coupled to the controller 108 and facilitates communication between the host 102 and the controller 108. The controller 108 is coupled to the memory 110 as well as to the NVM 114 via the NVM interface 112. The host interface 106 may be any suitable communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link.

The controller 108 controls operation of the SSD 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The memory 110 may be any suitable memory, computing device, or system capable of storing data. For example, the memory 110 may be ordinary RAM, DRAM, double data rate (DDR) RAM (DRAM), static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory. The NVM 114 receives data from the controller 108 via the NVM interface 112 and stores the data. The NVM 114 may be any suitable type of non-volatile memory, such as a NAND-type flash memory or the like. In the example of FIG. 1, the controller 108 may include hardware, firmware, software, or any combinations thereof that provide a deep learning neural network controller 116 for use with the NVM array 114.

Although FIG. 1 shows an example SSD and an SSD is generally used as an illustrative example in the description throughout, the various disclosed embodiments are not necessarily limited to an SSD application/implementation. As an example, the disclosed NVM die and associated processing components can be implemented as part of a package that includes other processing circuitry and/or components. For example, a processor may include, or otherwise be coupled with, embedded NVM and associated circuitry and/or components for deep learning that are described herein. The processor could, as one example, off-load certain deep learning tasks to the NVM and associated circuitry and/or components. As another example, the controller 108 may be a controller in another type of device and still include the neural network controller 116 and perform some or all of the functions described herein.

Figure 2:
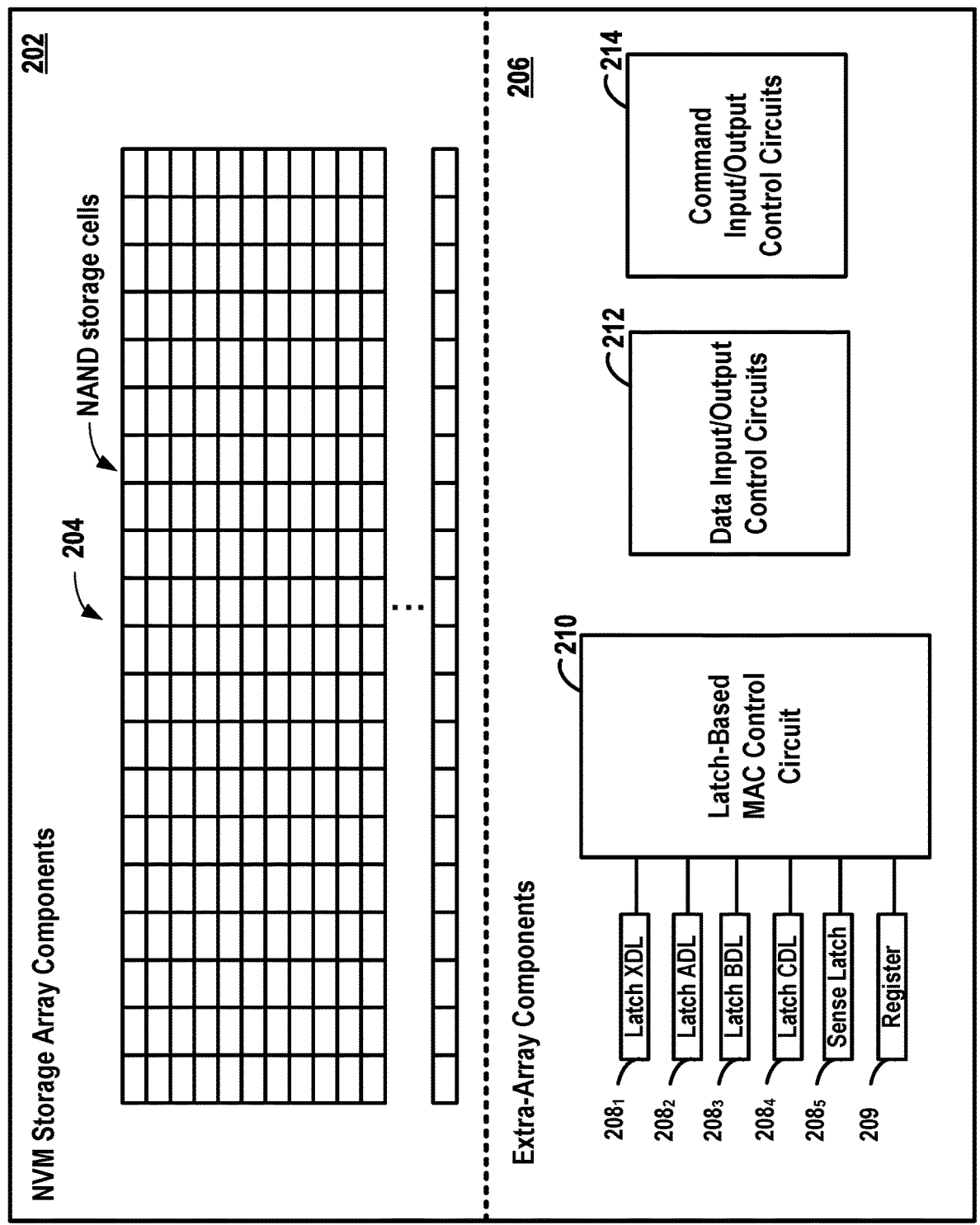
FIG. 2 illustrates an exemplary NVM array die according to aspects of the present disclosure that includes latches that may be used as a latch-based MAC unit.

FIG. 2 is a block diagram illustrating an exemplary NVM die 200 configured for performing linear latch-based MAC operations, such as MAC operations performed in connection with feedforward DLA procedures. For clarity, FIG. 2 omits other components that may be needed for performing other aspects of feedforward DLA procedures or for performing backpropagation procedures. Other figures, discussed below, illustrate those additional DLA features. NVM die 200 includes NVM storage array components 202 include NAND storage cells 204 for storing neural network data, where the cells may be arranged in word lines, blocks, planes, or the like. NVM die 200 also includes extra-array processing components 206, which are referred to herein as "extra-array" because they are not part of the NAND storage array 202. The extra-array components 206 may be configured, for example, as under-the-array or next-to-the array circuit components, and may include otherwise standard NAND die latches (XDL, ADL, BDL, CDL).

In the example of FIG. 2, the exemplary processing components 206 include: a set of latches 208, specifically $208_1$, $208_2$, $208_3$, $208_4$, and $208_5$, a register 209; a latch-based MAC control circuit 210 for controlling the latches 208 and the register 209 to perform MAC operations using linear processing, e.g., without decision branches; data input/output control circuits 212 for inputting data from the data storage controller (e.g., controller 108 of FIG. 1) and outputting data to the data storage controller; and command input/output control circuits 214 for inputting commands from the data storage controller, e.g., NVM read commands or write (program) commands and for outputting signals indicating completion of the commands (or error indicators if, for some reason, a particular command is not executed). Not all circuit or memory components that might be used in a practical NVM die are illustrated in the figure, such as voltage regulation components, clocks and timing components, etc. Rather only some components and circuits are shown, summarized as blocks.

Exemplary Latch-Based MAC Procedures

With reference to the following tables, various exemplary latch manipulation sequences will now be described that serve to perform MAC operations. These 4-bit examples are provided to illustrate the bit manipulations being performed, which can be extrapolated to other examples, such as 8-bit, 16-bit, or 32-bit cases. (For 64-bit and larger, it might be more efficient to implement the MAC using a data storage controller.) Although described with respect to processing neural network weight data, the MAC procedures described herein are applicable to other types of data as well. Generally speaking, these procedures may be advantageous in any data processing system where MAC processing is useful.

The latch-based operations described herein are performed without requiring decision logic, i.e., a high-speed linear process flow is provided. Herein, a linear sequence or linear flow is a sequence of operations that does not include or require any logical decisions that cause processing to branch into two or more processing flows. Generally speaking, linear sequences are much faster, especially when implemented using high speed latches and corresponding high speed AND circuits, OR circuits, shift circuits, etc. These operations are referred to herein as latch-based operations since they primarily exploit latches to store and manipulate bits but additional components may be used, such as an accumulator register to store a count.

Table I illustrates a first 4-bit example that provides a series of one hundred twenty-one operations that may be performed by control circuit 210 of FIG. 2 to perform MAC operations using a register and four latches (XDL, ADL, BDL, and CDL). The method operates to split the data into the individual bits of the multiplicand in the CDL and uses shifts to "weight" the results appropriately as the accumulation count proceeds where the count is maintained in the register. (Note that this usage of the term "weight" should not be confused with the concept of a neural network weight, discussed above.) By weighting the results appropriately, it is meant that the procedure takes into account the magnitude (or mathematical exponent power) of the bits, e.g., whether a bit corresponds to 0001, 0010, 0100, or 1000.

The following 4-bit multiplication representation or "cheat sheet" may be helpful in understanding the operations performed in the procedure of Table I:

```
        A     B     C     D
  X     E     F     G     H
  -----------------------------
         (H&A)<<3+(H&B)<<2+(H&C)<<1+(H&B)
      +(G&A)<<4+(G&B)<<3+(G&C)<<2+(G&D)<<1
   +(F&A)<<5+(F&B)<<4+(F&C)<<3+(F&D)<<2
+(E&A)<<6+(E&B)<<5+(E&C)<<4+(E&D)<<3
```

In this example, two 4-bit multiplicands (ABCD and EFGH) are multiplied together. The symbol "<<" denotes a left shift to account for the magnitude of various intermediate values, where, for example, <<1 denotes a one-bit left shift, <<2 denotes a two-bit left shift, <<3 denotes a three-bit left shift, and so on. (Note that shifting by one is the same as multiplying by two, shifting by two is the same as multiplying by four, and shifting by three is the same as multiplying by eight.) As shown, the H bit is first multiplied by D by ANDing H and D (i.e., H&D). The H bit is then multiplied by C by ANDing H and C (i.e., H&C), but this value needs to be shifted left by one bit to account for its greater magnitude. Hence, the result is shown as H&C<<1. The H bit is then multiplied by B by ANDing H and B (i.e., H&B), but this value needs to be shifted left by two bits to account for its greater magnitude. Hence, the result is shown as H&B<<2. The H bit is then multiplied by A by ANDing H and A (i.e., H&A), but this value needs to be shifted left by three bits to account for its greater magnitude. Hence, the result is shown as H&A<<3. Similarly, the multiplication of the G, F and E bits against ABCD proceeds as shown. The result is the sum of all of the intermediate values as shown.

Note that the final result of the MAC procedure of Table I is the final count in the accumulator register, which then can be used in neural network operations. The shifts may be performed using a barrel shifter circuit, if provided on the die. Adders may be performed by an adder circuit. The 4-bit exemplary processing flow of Table I can be modified to support arbitrarily large (or small) numbers by changing the number of iterations needed to form various masks and the iterations of masking and then accumulating as needed.

TABLE I

| | REGISTER OPERATION | LATCH OPERATION | LATCHES/REGISTERS EMPLOYED |
|---|---|---|---|
| 1. | | LOAD | First Multiplicands --> BDL |
| 2. | | LOAD | Second Multiplicands --> CDL |
| 3. | | LOAD | 0 x 1 --> XDL |
| 4. | | AND | CDL & XDL --> XDL |
| 5. | | LEFT SHIFT | XDL << 1 --> ADL |
| 6. | | OR | ADL | XDL --> XDL |
| 7. | | LEFT SHIFT | XDL << 1 --> ADL |
| 8. | | OR | ADL | XDL --> XDL |
| 9. | | LEFT SHIFT | XDL << 1 --> ADL |
| 10. | | OR | ADL | XDL --> XDL |
| 11. | | AND | XDL & BDL --> XDL |
| 12. | | COPY | XDL --> ADL |
| 13. | | LOAD | 0 x 1 --> XDL |
| 14. | | AND | ADL & XDL --> XDL |
| 15. | | COUNT | CountOnes(XDL) |
| 16. | ADD | | Count + Total --> Total |
| 17. | | LOAD | 0 x 2 --> XDL |
| 18. | | AND | ADL & XDL --> XDL |
| 19. | | COUNT | CountOnes(XDL) |
| 20. | LEFT SHIFT | | Count << 1 --> Count |
| 21. | ADD | | Count + Total --> Total |
| 22. | | LOAD | 0 x 4 --> XDL |
| 23. | | AND | ADL & XDL --> XDL |
| 24. | | COUNT | CountOnes(XDL) |
| 25. | LEFT SHIFT | | Count << 2 --> Count |
| 26. | ADD | | Count + Total --> Total |
| 27. | | LOAD | 0 x 8 --> XDL |

TABLE I-continued

| | REGISTER OPERATION | LATCH OPERATION | LATCHES/REGISTERS EMPLOYED |
|---|---|---|---|
| 28. | | AND | ADL & XDL --> XDL |
| 29. | | COUNT | CountOnes(XDL) |
| 30. | LEFT SHIFT | | Count << 3 --> Count |
| 31. | ADD | | Count + Total --> Total |
| 32. | | LOAD | 0 x 2 --> XDL |
| 33. | | AND | CDL & XDL --> XDL |
| 34. | | RIGHT SHIFT | XDL >> 1 --> ADL |
| 35. | | OR | ADL | XDL --> XDL |
| 36. | | LEFT SHIFT | XDL << 1 --> ADL |
| 37. | | OR | ADL | XDL --> XDL |
| 38. | | LEFT SHIFT | XDL << 1 --> ADL |
| 39. | | OR | ADL | XDL --> XDL |
| 40. | | AND | XDL & BDL --> XDL |
| 41. | | COPY | XDL --> ADL |
| 42. | | LOAD | 0 x 1 --> XDL |
| 43. | | AND | ADL & XDL --> XDL |
| 44. | | COUNT | CountOnes(XDL) |
| 45. | LEFT SHIFT | | Count << 1 --> Count |
| 46. | ADD | | Count + Total --> Total |
| 47. | | LOAD | 0 x 2 --> XDL |
| 48. | | AND | ADL & XDL --> XDL |
| 49. | | COUNT | CountOnes(XDL) |
| 50. | LEFT SHIFT | | Count << 2 --> Count |
| 51. | ADD | | Count + Total --> Total |
| 52. | | LOAD | 0 x 4 --> XDL |
| 53. | | AND | ADL & XDL --> XDL |
| 54. | | COUNT | CountOnes(XDL) |
| 55. | LEFT SHIFT | | Count << 3 --> Count |
| 56. | ADD | | Count + Total --> Total |
| 57. | | LOAD | 0 x 8 --> XDL |
| 58. | | AND | ADL & XDL --> XDL |

TABLE I-continued

| | REGISTER OPERATION | LATCH OPERATION | LATCHES/REGISTERS EMPLOYED |
|---|---|---|---|
| 59. | | COUNT | CountOnes(XDL) |
| 60. | LEFT SHIFT | | Count << 4 --> Count |
| 61. | ADD | | Count + Total --> Total |
| 62. | | LOAD | 0 × 4 --> XDL |
| 63. | | AND | CDL & XDL --> XDL |
| 64. | | LEFT SHIFT | XDL << 1 --> ADL |
| 65. | | OR | ADL | XDL --> XDL |
| 66. | | RIGHT SHIFT | XDL >> 1 --> ADL |
| 67. | | OR | ADL | XDL --> XDL |
| 68. | | RIGHT SHIFT | XDL >> 1 --> ADL |
| 69. | | OR | ADL | XDL --> XDL |
| 70. | | AND | XDL & BDL --> XDL |
| 71. | | COPY | XDL --> ADL |
| 72. | | LOAD | 0 × 1 --> XDL |
| 73. | | AND | ADL & XDL --> XDL |
| 74. | | COUNT | CountOnes(XDL) |
| 75. | LEFT SHIFT | | Count << 2 --> Count |
| 76. | ADD | | Count + Total --> Total |
| 77. | | LOAD | 0 × 2 --> XDL |
| 78. | | AND | ADL & XDL --> XDL |
| 79. | | COUNT | CountOnes(XDL) |
| 80. | LEFT SHIFT | | Count << 3 --> Count |
| 81. | ADD | | Count + Total --> Total |
| 82. | | LOAD | 0 × 4 --> XDL |
| 83. | | AND | ADL & XDL --> XDL |
| 84. | | COUNT | CountOnes(XDL) |
| 85. | LEFT SHIFT | | Count << 4 --> Count |
| 86. | ADD | | Count + Total --> Total |
| 87. | | LOAD | 0 × 8 --> XDL |
| 88. | | AND | ADL & XDL --> XDL |
| 89. | | COUNT | CountOnes(XDL) |
| 90. | LEFT SHIFT | | Count << 5 --> Count |
| 91. | ADD | | Count + Total --> Total |
| 92. | | LOAD | 0 × 8 --> XDL |
| 93. | | AND | CDL & XDL --> XDL |
| 94. | | RIGHT SHIFT | XDL >> 1 --> ADL |
| 95. | | OR | ADL | XDL --> XDL |
| 96. | | RIGHT SHIFT | XDL >> 1 --> ADL |
| 97. | | OR | ADL | XDL --> XDL |
| 98. | | RIGHT SHIFT | XDL >> 1 --> ADL |
| 99. | | OR | ADL | XDL --> XDL |
| 100. | | AND | XDL & BDL --> XDL |
| 101. | | COPY | XDL --> ADL |
| 102. | | LOAD | 0 × 1 --> XDL |
| 103. | | AND | ADL & XDL --> XDL |
| 104. | | COUNT | CountOnes(XDL) |
| 105. | LEFT SHIFT | | Count << 3 --> Count |
| 106. | ADD | | Count + Total --> Total |
| 107. | | LOAD | 0 × 2 --> XDL |
| 108. | | AND | ADL & XDL --> XDL |
| 109. | | COUNT | CountOnes(XDL) |
| 110. | LEFT SHIFT | | Count << 4 --> Count |
| 111. | ADD | | Count + Total --> Total |
| 112. | | LOAD | 0 × 4 --> XDL |
| 113. | | AND | ADL & XDL --> XDL |
| 114. | | COUNT | CountOnes(XDL) |
| 115. | LEFT SHIFT | | Count << 5 --> Count |
| 116. | ADD | | Count + Total --> Total |
| 117. | | LOAD | 0 × 8 --> XDL |
| 118. | | AND | ADL & XDL --> XDL |
| 119. | | COUNT | CountOnes(XDL) |
| 120. | LEFT SHIT | | Count << 6 --> Count |
| 121. | ADD | | Count + Total --> Total |

Steps 1-2 of Table I are preparatory steps for use in loading ABCD into BDL and EFGH into CDL (which then do not change during the procedure).

Steps 3-31 of Table I process the H bit of the EFGH multiplicand, including loading a mask 0×1 into the XDL latch (step 3) so that, when XDL is ANDed with CDL (step 4), XDL then holds 000H. Steps 5-10 are a series of four pairs of SHIFT/OR operations, one such pair for each of the four bits. (For an eight bit example, eight such pairs would instead be used.) Steps 11-12 serve to AND the current value in XDL with BDL (which holds ABCD throughout the procedure) and COPY the result into ADL. ADL, at that point, thus stores H&A, H&B, H&C, and H&D in its four bits (or (H&A)<<3+(H&B)<<2+(H&C)<<1+(H&D), as shown in the cheat sheet above). Steps 13-16 serve to count the number of is in the first (right-most) bit location of XDL (again using the 0×1 mask) and increment the count in the register. Steps 17-21 serve to count the number of is in the second bit location of XDL (using an 0×2 mask) and increment the count in the register. Steps 22-26 serve to count the number of is in the third bit location of XDL (using an 0×4 mask) and increment the count in the register. Steps 27-31 serve to count the number of 1s in the fourth (left-most) bit location of XDL (using an 0×8 mask) and increment the count in the register, to complete the first stage of the overall procedure to process the H bit of the EFGH.

Steps 32-61 of Table I then process the G bit of the EFGH multiplicand, including loading a mask 0×2 into the XDL latch (step 32) so that, when XDL is ANDed with CDL (step 33), XDL then holds 00G0. The other steps in Steps 32-61 are similar to those of Steps 3-31 but devoted to processing the G bit and incrementing the count in the register at Step 61.

Steps 62-91 of Table I then process the F bit of the EFGH multiplicand, including loading a mask 0×4 into the XDL latch (step 62) so that, when XDL is ANDed with CDL (step 63), XDL then holds 0F00. The other steps in Steps 62-91 are again similar to those of Steps 3-31 but devoted to processing the F bit and incrementing the count in the register at Step 91.

Steps 92-121 of Table I then process the E bit of the EFGH multiplicand, including loading a mask 0×8 into the XDL latch (step 92) so that, when XDL is ANDed with CDL (step 93), XDL then holds E000. The other steps in Steps 92-121 are again similar to those of Steps 3-31 but devoted to processing the E bit and incrementing the count in the register at Step 121, thus yielding the final MAC result.

Insofar as the COUNT operations listed in the procedure of Table I, while it is possible to instead exploit a binary half adder/adder with latches on the NVM die as part of the MAC operations, it is believed to be more efficient just to just count the bits (as shown), especially since the goal is multiplication and accumulation, not just multiplication. (In an alternative implementation, where only multiplication is done, then it may be important to sum the results of the individual bits of the multiplicand in the CDL, which can be done in parallel, if the NVM die has sufficient latch counts and/or additional transistors.)

Tables II-III illustrate the intermediate values within the XDL and ADL latches for each step in the procedure of Table I where a MAC operation is applied to two four-bit multiplicands: ABCD and EFGH, which are initially loaded into the BDL and CDL latches. In this example, the value of ABCD initially loaded into the BDL latch and the value of EFGH initially loaded into the CDL latch do not change throughout the procedure and hence separate tables for BDL and CDL are not provided. Note that the "x" in these tables represents an initially unspecified or "don't care" value. In some examples, the latch may be cleared to all zeros before operation of the procedure, though that is not needed since, whatever those initial values are, they will be over-written with new values as the operation proceeds.

TABLE II

| | XDL LATCH | | | |
|---|---|---|---|---|
| 1. | X | X | X | X |
| 2. | X | X | X | X |
| 3. | 0 | 0 | 0 | 1 |
| 4. | 0 | 0 | 0 | H |

TABLE II-continued

XDL LATCH

| | | | | |
|---|---|---|---|---|
| 5. | 0 | 0 | 0 | H |
| 6. | 0 | 0 | H | H |
| 7. | 0 | 0 | H | H |
| 8. | 0 | H | H | H |
| 9. | 0 | H | H | H |
| 10. | H | H | H | H |
| 11. | H&A | H&B | H&C | H&D |
| 12. | H&A | H&B | H&C | H&D |
| 13. | 0 | 0 | 0 | 1 |
| 14. | 0 | 0 | 0 | H&D |
| 15. | 0 | 0 | 0 | H&D |
| 16. | 0 | 0 | 0 | H&D |
| 17. | 0 | 0 | 1 | 0 |
| 18. | 0 | 0 | H&C | 0 |
| 19. | 0 | 0 | H&C | 0 |
| 20. | 0 | 0 | H&C | 0 |
| 21. | 0 | 0 | H&C | 0 |
| 22. | 0 | 1 | 0 | 0 |
| 23. | 0 | H&B | 0 | 0 |
| 24. | 0 | H&B | 0 | 0 |
| 25. | 0 | H&B | 0 | 0 |
| 26. | 0 | H&B | 0 | 0 |
| 27. | 1 | 0 | 0 | 0 |
| 28. | H&A | 0 | 0 | 0 |
| 29. | H&A | 0 | 0 | 0 |
| 30. | H&A | 0 | 0 | 0 |
| 31. | H&A | 0 | 0 | 0 |
| 32. | 0 | 0 | 1 | 0 |
| 33. | 0 | 0 | G | 0 |
| 34. | 0 | 0 | G | 0 |
| 35. | 0 | 0 | G | G |
| 36. | 0 | 0 | G | G |
| 37. | 0 | G | G | G |
| 38. | 0 | G | G | G |
| 39. | G | G | G | G |
| 40. | G&A | G&B | G&C | G&D |
| 41. | G&A | G&B | G&C | G&D |
| 42. | 0 | 0 | 0 | 1 |
| 43. | 0 | 0 | 0 | G&D |
| 44. | 0 | 0 | 0 | G&D |
| 45. | 0 | 0 | 0 | G&D |
| 46. | 0 | 0 | 0 | G&D |
| 47. | 0 | 0 | 1 | 0 |
| 48. | 0 | 0 | G&C | 0 |
| 49. | 0 | 0 | G&C | 0 |
| 50. | 0 | 0 | G&C | 0 |
| 51. | 0 | 0 | G&C | 0 |
| 52. | 0 | 1 | 0 | 0 |
| 53. | 0 | G&B | 0 | 0 |
| 54. | 0 | G&B | 0 | 0 |
| 55. | 0 | G&B | 0 | 0 |
| 56. | 0 | G&B | 0 | 0 |
| 57. | 1 | 0 | 0 | 0 |
| 58. | G&A | 0 | 0 | 0 |
| 59. | G&A | 0 | 0 | 0 |
| 60. | G&A | 0 | 0 | 0 |
| 61. | G&A | 0 | 0 | 0 |
| 62. | 0 | 1 | 0 | 0 |
| 63. | 0 | F | 0 | 0 |
| 64. | 0 | F | 0 | 0 |
| 65. | F | F | 0 | 0 |
| 66. | F | F | 0 | 0 |
| 67. | F | F | F | 0 |
| 68. | F | F | F | 0 |
| 69. | F | F | F | F |
| 70. | F&A | F&B | F&C | F&D |
| 71. | F&A | F&B | F&C | F&D |
| 72. | 0 | 0 | 0 | 1 |
| 73. | 0 | 0 | 0 | F&D |
| 74. | 0 | 0 | 0 | F&D |
| 75. | 0 | 0 | 0 | F&D |
| 76. | 0 | 0 | 0 | F&D |
| 77. | 0 | 0 | 1 | 0 |
| 78. | 0 | 0 | F&C | 0 |
| 79. | 0 | 0 | F&C | 0 |
| 80. | 0 | 0 | F&C | 0 |
| 81. | 0 | 0 | F&C | 0 |
| 82. | 0 | 1 | 0 | 0 |
| 83. | 0 | F&B | 0 | 0 |
| 84. | 0 | F&B | 0 | 0 |
| 85. | 0 | F&B | 0 | 0 |
| 86. | 0 | F&B | 0 | 0 |
| 87. | 1 | 0 | 0 | 0 |
| 88. | F&A | 0 | 0 | 0 |
| 89. | F&A | 0 | 0 | 0 |
| 90. | F&A | 0 | 0 | 0 |
| 91. | F&A | 0 | 0 | 0 |
| 92. | 1 | 0 | 0 | 0 |
| 93. | E | 0 | 0 | 0 |
| 94. | E | 0 | 0 | 0 |
| 95. | E | E | 0 | 0 |
| 96. | E | E | 0 | 0 |
| 97. | E | E | E | 0 |
| 98. | E | E | E | 0 |
| 99. | E | E | E | E |
| 100. | E&A | E&B | E&C | E&D |
| 101. | E&A | E&B | E&C | E&D |
| 102. | 0 | 0 | 0 | 1 |
| 103. | 0 | 0 | 0 | E&D |
| 104. | 0 | 0 | 0 | E&D |
| 105. | 0 | 0 | 0 | E&D |
| 106. | 0 | 0 | 0 | E&D |
| 107. | 0 | 0 | 1 | 0 |
| 108. | 0 | 0 | E&C | 0 |
| 109. | 0 | 0 | E&C | 0 |
| 110. | 0 | 0 | E&C | 0 |
| 111. | 0 | 0 | E&C | 0 |
| 112. | 0 | 1 | 0 | 0 |
| 113. | 0 | E&B | 0 | 0 |
| 114. | 0 | E&B | 0 | 0 |
| 115. | 0 | E&B | 0 | 0 |
| 116. | 0 | E&B | 0 | 0 |
| 117. | 1 | 0 | 0 | 0 |
| 118. | E&A | 0 | 0 | 0 |
| 119. | E&A | 0 | 0 | 0 |
| 120. | E&A | 0 | 0 | 0 |
| 121. | E&A | 0 | 0 | 0 |

TABLE III

ADL LATCH

| | | | | |
|---|---|---|---|---|
| 1. | X | X | X | X |
| 2. | X | X | X | X |
| 3. | X | X | X | X |
| 4. | X | X | X | X |
| 5. | 0 | 0 | H | 0 |
| 6. | 0 | 0 | H | 0 |
| 7. | 0 | H | H | 0 |
| 8. | 0 | H | H | 0 |
| 9. | H | H | H | 0 |
| 10. | H | H | H | 0 |
| 11. | H | H | H | 0 |
| 12. | H&A | H&B | H&C | H&D |
| 13. | H&A | H&B | H&C | H&D |
| 14. | H&A | H&B | H&C | H&D |
| 15. | H&A | H&B | H&C | H&D |
| 16. | H&A | H&B | H&C | H&D |
| 17. | H&A | H&B | H&C | H&D |
| 18. | H&A | H&B | H&C | H&D |
| 19. | H&A | H&B | H&C | H&D |
| 20. | H&A | H&B | H&C | H&D |
| 21. | H&A | H&B | H&C | H&D |
| 22. | H&A | H&B | H&C | H&D |
| 23. | H&A | H&B | H&C | H&D |
| 24. | H&A | H&B | H&C | H&D |
| 25. | H&A | H&B | H&C | H&D |
| 26. | H&A | H&B | H&C | H&D |
| 27. | H&A | H&B | H&C | H&D |
| 28. | H&A | H&B | H&C | H&D |
| 29. | H&A | H&B | H&C | H&D |
| 30. | H&A | H&B | H&C | H&D |
| 31. | H&A | H&B | H&C | H&D |

TABLE III-continued

ADL LATCH

| | | | | |
|---|---|---|---|---|
| 32. | H&A | H&B | H&C | H&D |
| 33. | H&A | H&B | H&C | H&D |
| 34. | 0 | 0 | 0 | G |
| 35. | 0 | 0 | 0 | G |
| 36. | 0 | G | G | 0 |
| 37. | 0 | G | G | 0 |
| 38. | G | G | G | 0 |
| 39. | G | G | G | 0 |
| 40. | G | G | G | 0 |
| 41. | G&A | G&B | G&C | G&D |
| 42. | G&A | G&B | G&C | G&D |
| 43. | G&A | G&B | G&C | G&D |
| 44. | G&A | G&B | G&C | G&D |
| 45. | G&A | G&B | G&C | G&D |
| 46. | G&A | G&B | G&C | G&D |
| 47. | G&A | G&B | G&C | G&D |
| 48. | G&A | G&B | G&C | G&D |
| 49. | G&A | G&B | G&C | G&D |
| 50. | G&A | G&B | G&C | G&D |
| 51. | G&A | G&B | G&C | G&D |
| 52. | G&A | G&B | G&C | G&D |
| 53. | G&A | G&B | G&C | G&D |
| 54. | G&A | G&B | G&C | G&D |
| 55. | G&A | G&B | G&C | G&D |
| 56. | G&A | G&B | G&C | G&D |
| 57. | G&A | G&B | G&C | G&D |
| 58. | G&A | G&B | G&C | G&D |
| 59. | G&A | G&B | G&C | G&D |
| 60. | G&A | G&B | G&C | G&D |
| 61. | G&A | G&B | G&C | G&D |
| 62. | G&A | G&B | G&C | G&D |
| 63. | G&A | G&B | G&C | G&D |
| 64. | F | 0 | 0 | 0 |
| 65. | F | 0 | 0 | 0 |
| 66. | 0 | F | F | 0 |
| 67. | 0 | F | F | 0 |
| 68. | 0 | F | F | F |
| 69. | 0 | F | F | F |
| 70. | 0 | F | F | F |
| 71. | F&A | F&B | F&C | F&D |
| 72. | F&A | F&B | F&C | F&D |
| 73. | F&A | F&B | F&C | F&D |
| 74. | F&A | F&B | F&C | F&D |
| 75. | F&A | F&B | F&C | F&D |
| 76. | F&A | F&B | F&C | F&D |
| 77. | F&A | F&B | F&C | F&D |
| 78. | F&A | F&B | F&C | F&D |
| 79. | F&A | F&B | F&C | F&D |
| 80. | F&A | F&B | F&C | F&D |
| 81. | F&A | F&B | F&C | F&D |
| 82. | F&A | F&B | F&C | F&D |
| 83. | F&A | F&B | F&C | F&D |
| 84. | F&A | F&B | F&C | F&D |
| 85. | F&A | F&B | F&C | F&D |
| 86. | F&A | F&B | F&C | F&D |
| 87. | F&A | F&B | F&C | F&D |
| 88. | F&A | F&B | F&C | F&D |
| 89. | F&A | F&B | F&C | F&D |
| 90. | F&A | F&B | F&C | F&D |
| 91. | F&A | F&B | F&C | F&D |
| 92. | F&A | F&B | F&C | F&D |
| 93. | F&A | F&B | F&C | F&D |
| 94. | 0 | E | 0 | 0 |
| 95. | 0 | E | 0 | 0 |
| 96. | 0 | E | E | 0 |
| 97. | 0 | E | E | E |
| 98. | 0 | E | E | E |
| 99. | 0 | E | E | E |
| 100. | 0 | E | E | E |
| 101. | E&A | E&B | E&C | E&D |
| 102. | E&A | E&B | E&C | E&D |
| 103. | E&A | E&B | E&C | E&D |
| 104. | E&A | E&B | E&C | E&D |
| 105. | E&A | E&B | E&C | E&D |
| 106. | E&A | E&B | E&C | E&D |
| 107. | E&A | E&B | E&C | E&D |
| 108. | E&A | E&B | E&C | E&D |
| 109. | E&A | E&B | E&C | E&D |
| 110. | E&A | E&B | E&C | E&D |
| 111. | E&A | E&B | E&C | E&D |
| 112. | E&A | E&B | E&C | E&D |
| 113. | E&A | E&B | E&C | E&D |
| 114. | E&A | E&B | E&C | E&D |
| 115. | E&A | E&B | E&C | E&D |
| 116. | E&A | E&B | E&C | E&D |
| 117. | E&A | E&B | E&C | E&D |
| 118. | E&A | E&B | E&C | E&D |
| 119. | E&A | E&B | E&C | E&D |
| 120. | E&A | E&B | E&C | E&D |
| 121. | E&A | E&B | E&C | E&D |

Table IV illustrates a second 4-bit example that provides a series of one-hundred forty-six operations that may be performed by control circuit 210 of FIG. 2 to perform MAC operations using a register and five latches (XDL, ADL, BDL, CDL, and a sense latch, SEN). The final result of the MAC is again the final count in the register, which can be used in neural network operations. Although this procedure uses more steps that the procedure of Table I, it may be more efficient in terms of code space. That is, the procedure of Table IV trades performance for code space.

TABLE IV

| | REGISTER OPERATION | LATCH OPERATION | LATCHES/REGISTERS EMPLOYED |
|---|---|---|---|
| 1. | | LOAD | First Multiplicands --> BDL |
| 2. | | LOAD | Second Multiplicands --> CDL |
| 3. | | COPY | CDL --> ADL |
| 4. | | AND | ADL & BDL --> ADL |
| 5. | | COPY | ADL --> SEN |
| 6. | | LOAD | 0 × 1 --> XDL |
| 7. | | COPY | XDL --> ADL |
| 8. | | COPY | SEN --> XDL |
| 9. | | AND | ADL & XDL --> XDL |
| 10. | | COUNT | CountOnes(XDL) |
| 11. | ADD | | Count + Total --> Total |
| 12. | | LEFT SHIFT | ADL << 1 --> XDL |
| 13. | | COPY | XDL --> ADL |
| 14. | | COPY | SEN --> XDL |
| 15. | | AND | ADL & XDL --> XDL |
| 16. | | COUNT | CountOnes(XDL) |
| 17. | LEFT SHIFT | | Count << 2 --> Count |
| 18. | ADD | | Count + Total --> Total |
| 19. | | LEFT SHIFT | ADL << 1 --> XDL |
| 20. | | COPY | XDL --> ADL |
| 21. | | COPY | SEN --> XDL |
| 22. | | AND | ADL & XDL --> XDL |
| 23. | | COUNT | CountOnes(XDL) |
| 24. | LEFT SHIFT | | Count << 4 --> Count |
| 25. | ADD | | Count + Total --> Total |
| 26. | | LEFT SHIFT | ADL << 1 --> XDL |
| 27. | | COPY | XDL --> ADL |
| 28. | | COPY | SEN --> XDL |
| 29. | | AND | ADL & XDL --> XDL |
| 30. | | COUNT | CountOnes(XDL) |
| 31. | LEFT SHIFT | | Count << 6 --> Count |
| 32. | ADD | | Count + Total --> Total |
| 33. | | COPY | ADL --> SEN |
| 34. | | COPY | CDL --> ADL |
| 35. | | LEFT SHIFT | ADL << 1 --> XDL |
| 36. | | AND | BDL & XDL --> XDL |
| 37. | | COPY | SEN --> ADL |
| 38. | | COPY | XDL --> SEN |
| 39. | | AND | ADL & XDL --> XDL |
| 40. | | COUNT | CountOnes(XDL) |
| 41. | LEFT SHIFT | | Count << 5 --> Count |
| 42. | ADD | | Count + Total --> Total |
| 43. | | RIGHT SHIFT | ADL >> 1 --> XDL |
| 44. | | COPY | XDL --> ADL |
| 45. | | COPY | SEN --> XDL |

TABLE IV-continued

| | REGISTER OPERATION | LATCH OPERATION | LATCHES/REGISTERS EMPLOYED |
|---|---|---|---|
| 46. | | AND | ADL & XDL --> XDL |
| 47. | | COUNT | CountOnes(XDL) |
| 48. | LEFT SHIFT | | Count << 3 --> Count |
| 49. | ADD | | Count + Total --> Total |
| 50. | | RIGHT SHIFT | ADL >> 1 --> XDL |
| 51. | | COPY | XDL --> ADL |
| 52. | | COPY | SEN --> XDL |
| 53. | | AND | ADL & XDL --> XDL |
| 54. | | COUNT | CountOnes(XDL) |
| 55. | LEFT SHIFT | | Count << 1 --> Count |
| 56. | ADD | | Count + Total --> Total |
| 57. | | COPY | ADL --> SEN |
| 58. | | COPY | CDL --> XDL |
| 59. | | LEFT SHIFT | XDL << 1 --> ADL |
| 60. | | LEFT SHIFT | ADL << 1 --> XDL |
| 61. | | AND | BDL & XDL --> XDL |
| 62. | | COPY | SEN --> ADL |
| 63. | | COPY | XDL --> SEN |
| 64. | | LEFT SHIFT | ADL << 1 --> XDL |
| 65. | | COPY | XDL --> ADL |
| 66. | | COPY | SEN --> XDL |
| 67. | | AND | ADL & XDL --> XDL |
| 68. | | COUNT | CountOnes(XDL) |
| 69. | LEFT SHIFT | | Count << 2 --> Count |
| 70. | ADD | | Count + Total --> Total |
| 71. | | LEFT SHIFT | ADL << 1 --> XDL |
| 72. | | COPY | XDL --> ADL |
| 73. | | COPY | SEN --> XDL |
| 74. | | AND | ADL & XDL --> XDL |
| 75. | | COUNT | CountOnes(XDL) |
| 76. | LEFT SHIFT | | Count << 4 --> Count |
| 77. | ADD | | Count + Total --> Total |
| 78. | | COPY | ADL --> SEN |
| 79. | | COPY | CDL --> ADL |
| 80. | | LEFT SHIFT | ADL << 1 --> XDL |
| 81. | | LEFT SHIFT | XDL << 1 --> ADL |
| 82. | | LEFT SHIFT | ADL << 1 --> XDL |
| 83. | | AND | BDL & XDL --> XDL |
| 84. | | COPY | SEN --> ADL |
| 85. | | AND | ADL & XDL --> XDL |
| 86. | | COUNT | CountOnes(XDL) |
| 87. | LEFT SHIFT | | Count << 3 --> Count |
| 88. | ADD | | Count + Total --> Total |
| 89. | | COPY | CDL --> ADL |
| 90. | | RIGHT SHIFT | ADL >> 1 --> XDL |
| 91. | | AND | BDL & XDL --> XDL |
| 92. | | COPY | SEN --> ADL |
| 93. | | COPY | XDL --> SEN |
| 94. | | RIGHT SHIFT | ADL >> 1 --> XDL |
| 95. | | COPY | XDL --> ADL |
| 96. | | COPY | SEN --> XDL |
| 97. | | AND | ADL & XDL --> XDL |
| 98. | | COUNT | CountOnes(XDL) |
| 99. | LEFT SHIFT | | Count << 5 --> Count |
| 100. | ADD | | Count + Total --> Total |
| 101. | | RIGHT SHIFT | ADL >> 1 --> XDL |
| 102. | | COPY | XDL --> ADL |
| 103. | | COPY | SEN --> XDL |
| 104. | | AND | ADL & XDL --> XDL |
| 105. | | COUNT | CountOnes(XDL) |
| 106. | LEFT SHIFT | | Count << 3 --> Count |
| 107. | ADD | | Count + Total --> Total |
| 108. | | RIGHT SHIFT | ADL >> 1 --> XDL |
| 109. | | COPY | XDL --> ADL |
| 110. | | COPY | SEN --> XDL |
| 111. | | AND | ADL & XDL --> XDL |
| 112. | | COUNT | CountOnes(XDL) |
| 113. | LEFT SHIFT | | Count << 1 --> Count |
| 114. | ADD | | Count + Total --> Total |
| 115. | | COPY | ADL --> SEN |
| 116. | | COPY | CDL --> XDL |
| 117. | | RIGHT SHIFT | XDL >> 1 --> ADL |
| 118. | | RIGHT SHIFT | ADL >> 1 --> XDL |
| 119. | | AND | BDL & XDL --> XDL |
| 120. | | COPY | SEN --> ADL |
| 121. | | COPY | XDL --> SEN |
| 122. | | AND | ADL & XDL --> XDL |
| 123. | | COUNT | CountOnes(XDL) |
| 124. | LEFT SHIFT | | Count << 2 --> Count |
| 125. | ADD | | Count + Total --> Total |
| 126. | | LEFT SHIFT | ADL << 1 --> XDL |
| 127. | | COPY | XDL --> ADL |
| 128. | | COPY | SEN --> XDL |
| 129. | | AND | ADL & XDL --> XDL |
| 130. | | COUNT | CountOnes(XDL) |
| 131. | LEFT SHIFT | | Count << 4 --> Count |
| 132. | ADD | | Count + Total --> Total |
| 133. | | COPY | ADL --> SEN |
| 134. | | COPY | CDL --> ADL |
| 135. | | RIGHT SHIFT | ADL --> XDL |
| 136. | | RIGHT SHIFT | XDL --> ADL |
| 137. | | RIGHT SHIFT | ADL --> XDL |
| 138. | | AND | BDL & XDL --> XDL |
| 139. | | COPY | SEN --> ADL |
| 140. | | COPY | XDL --> SEN |
| 141. | | RIGHT SHIFT | ADL >> 1 --> XDL |
| 142. | | COPY | SEN --> ADL |
| 143. | | AND | ADL & XDL --> XDL |
| 144. | | COUNT | CountOnes(XDL) |
| 145. | LEFT SHIFT | | Count << 3 --> Count |
| 146. | ADD | | Count + Total --> Total |

Table V illustrates a third 4-bit example that provides a series of one-hundred forty-five operations that may be performed by control circuit 210 of FIG. 2 to perform MAC operations using a register and five latches (XDL, ADL, BDL, CDL, and a sense latch, SEN). The final result of the MAC is again the final count in the register, which can be used in neural network operations. This procedure uses more steps than the procedure of Table I, yet may be more efficient in terms of code space.

TABLE VI

| | REGISTER OPERATION | LATCH OPERATION | LATCHES/REGISTERS EMPLOYED |
|---|---|---|---|
| 1. | | LOAD | First Multiplicands --> BDL |
| 2. | | LOAD | Second Multiplicands --> CDL |
| 3. | | COPY | CDL --> ADL |
| 4. | | AND | ADL & BDL --> ADL |
| 5. | | COPY | ADL --> SEN |
| 6. | | LOAD | 0 × 1 --> XDL |
| 7. | | COPY | XDL --> ADL |
| 8. | | COPY | SEN --> XDL |
| 9. | | AND | ADL & XDL --> XDL |
| 10. | | COUNT | CountOnes(XDL) |
| 11. | ADD | | Count + Total --> Total |
| 12. | | LEFT SHIFT | ADL << 1 --> XDL |
| 13. | | COPY | XDL --> ADL |
| 14. | | COPY | SEN --> XDL |
| 15. | | AND | ADL & XDL --> XDL |
| 16. | | COUNT | CountOnes(XDL) |
| 17. | LEFT SHIFT | | Count << 2 --> Count |
| 18. | ADD | | Count + Total --> Total |
| 19. | | LEFT SHIFT | ADL << 1 --> XDL |
| 20. | | COPY | XDL --> ADL |
| 21. | | COPY | SEN --> XDL |
| 22. | | AND | ADL & XDL --> XDL |
| 23. | | COUNT | CountOnes(XDL) |
| 24. | LEFT SHIFT | | Count << 4 --> Count |
| 25. | ADD | | Count + Total --> Total |
| 26 | | LEFT SHIFT | ADL << 1 --> XDL |
| 27. | | COPY | XDL --> ADL |
| 28 | | COPY | SEN --> XDL |
| 29. | | AND | ADL & XDL --> XDL |
| 30. | | COUNT | CountOnes(XDL) |
| 31. | LEFT SHIFT | | Count << 6 --> Count |
| 32. | ADD | | Count + Total --> Total |
| 33. | | COPY | ADL --> SEN |
| 34. | | COPY | CDL --> ADL |

TABLE VI-continued

| REGISTER OPERATION | LATCH OPERATION | LATCHES/REGISTERS EMPLOYED |
|---|---|---|
| 35. | LEFT SHIFT | ADL << 1 --> XDL |
| 36. | AND | BDL & XDL --> XDL |
| 37. | COPY | SEN --> ADL |
| 38. | COPY | XDL --> SEN |
| 39. | AND | ADL & XDL --> XDL |
| 40. | COUNT | CountOnes(XDL) |
| 41. LEFT SHIFT | | Count << 5 --> Count |
| 42. ADD | | Count + Total --> Total |
| 43. | RIGHT SHIFT | ADL >> 1 --> XDL |
| 44. | COPY | XDL --> ADL |
| 45. | COPY | SEN --> XDL |
| 46. | AND | ADL & XDL --> XDL |
| 47. | COUNT | CountOnes(XDL) |
| 48. LEFT SHIFT | | Count << 3 --> Count |
| 49. ADD | | Count + Total --> Total |
| 50. | RIGHT SHIFT | ADL >> 1 --> XDL |
| 51. | COPY | XDL --> ADL |
| 52. | COPY | SEN --> XDL |
| 53. | AND | ADL & XDL --> XDL |
| 54. | COUNT | CountOnes(XDL) |
| 55. LEFT SHIFT | | Count << 1 --> Count |
| 56. ADD | | Count + Total --> Total |
| 57. | LEFT SHIFT | ADL << 1 --> XDL |
| 58. | COPY | XDL --> SEN |
| 59. | COPY | CDL --> XDL |
| 60. | LEFT SHIFT | XDL << 1 --> ADL |
| 61. | LEFT SHIFT | ADL << 1 --> XDL |
| 62. | AND | BDL & XDL --> XDL |
| 63. | COPY | SEN --> ADL |
| 64. | COPY | XDL --> SEN |
| 65. | COPY | SEN --> XDL |
| 66. | AND | ADL & XDL --> XDL |
| 67. | COUNT | CountOnes(XDL) |
| 68. LEFT SHIFT | | Count << 2 --> Count |
| 69. ADD | | Count + Total --> Total |
| 70. | LEFT SHIFT | ADL << 1 --> XDL |
| 71. | COPY | XDL --> ADL |
| 72. | COPY | SEN --> XDL |
| 73. | AND | ADL & XDL --> XDL |
| 74. | COUNT | CountOnes(XDL) |
| 75. LEFT SHIFT | | Count << 4 --> Count |
| 76. ADD | | Count + Total --> Total |
| 77. | COPY | ADL --> SEN |
| 78. | COPY | CDL --> ADL |
| 79. | LEFT SHIFT | ADL << 1 --> XDL |
| 80. | LEFT SHIFT | XDL << 1 --> ADL |
| 81. | LEFT SHIFT | ADL << 1 --> XDL |
| 82. | AND | BDL & XDL --> XDL |
| 83. | COPY | SEN --> ADL |
| 84. | AND | ADL & XDL --> XDL |
| 85. | COUNT | CountOnes(XDL) |
| 86. LEFT SHIFT | | Count << 3 --> Count |
| 87. ADD | | Count + Total --> Total |
| 88. | RIGHT SHIFT | ADL >> 1 --> XDL |
| 89. | COPY | XDL --> SEN |
| 90. | COPY | CDL --> ADL |
| 91. | RIGHT SHIFT | ADL >> 1 --> XDL |
| 92. | AND | BDL & XDL --> XDL |
| 93. | COPY | SEN --> ADL |
| 94. | COPY | XDL --> SEN |
| 95. | COPY | SEN --> XDL |
| 96. | AND | ADL & XDL --> XDL |
| 97. | COUNT | CountOnes(XDL) |
| 98. LEFT SHIFT | | Count << 5 --> Count |
| 99. ADD | | Count + Total --> Total |
| 100. | RIGHT SHIFT | ADL >> 1 --> XDL |
| 101. | COPY | XDL --> ADL |
| 102. | COPY | SEN --> XDL |
| 103. | AND | ADL & XDL --> XDL |
| 104. | COUNT | CountOnes(XDL) |
| 105. LEFT SHIFT | | Count << 3 --> Count |
| 106. ADD | | Count + Total --> Total |
| 107. | RIGHT SHIFT | ADL >> 1 --> XDL |
| 108. | COPY | XDL --> ADL |
| 109. | COPY | SEN --> XDL |
| 110. | AND | ADL & XDL --> XDL |
| 111. | COUNT | CountOnes(XDL) |
| 112. LEFT SHIFT | | Count << 1 --> Count |
| 113. ADD | | Count + Total --> Total |
| 114. | COPY | ADL --> SEN |
| 115. | COPY | CDL --> XDL |
| 116. | RIGHT SHIFT | XDL >> 1 --> ADL |
| 117. | RIGHT SHIFT | ADL >> 1 --> XDL |
| 118. | AND | BDL & XDL --> XDL |
| 119. | COPY | SEN --> ADL |
| 120. | COPY | XDL --> SEN |
| 121. | AND | ADL & XDL --> XDL |
| 122. | COUNT | CountOnes(XDL) |
| 123. LEFT SHIFT | | Count << 2 --> Count |
| 124. ADD | | Count + Total --> Total |
| 125. | LEFT SHIFT | ADL << 1 --> XDL |
| 126. | COPY | XDL --> ADL |
| 127. | COPY | SEN --> XDL |
| 128. | AND | ADL & XDL --> XDL |
| 129. | COUNT | CountOnes(XDL) |
| 130. LEFT SHIFT | | Count << 4 --> Count |
| 131. ADD | | Count + Total --> Total |
| 132. | COPY | ADL --> SEN |
| 133. | COPY | CDL --> ADL |
| 134. | RIGHT SHIFT | ADL --> XDL |
| 135. | RIGHT SHIFT | XDL --> ADL |
| 136. | RIGHT SHIFT | ADL --> XDL |
| 137. | AND | BDL & XDL --> XDL |
| 138. | COPY | SEN --> ADL |
| 139. | COPY | XDL --> SEN |
| 140. | RIGHT SHIFT | ADL >> 1 --> XDL |
| 141. | COPY | SEN --> ADL |
| 142. | AND | ADL & XDL --> XDL |
| 143. | COUNT | CountOnes(XDL) |
| 144. LEFT SHIFT | | Count << 3 --> Count |
| 145. ADD | | Count + Total --> Total |

What has been described with reference to Tables I-VI are various exemplary latch-based procedures for performing MAC operations. Other sequences of operations may be designed to perform the MAC operations, in some cases using more or fewer operations and more or fewer latches. Although well-suited for use within NVM dies that are often configured with suitable latches as standard features, aspects of these procedures may be applied to other memory devices as well, such as volatile memories, especially if they are equipped with suitable latches and registers.

Figure 3:
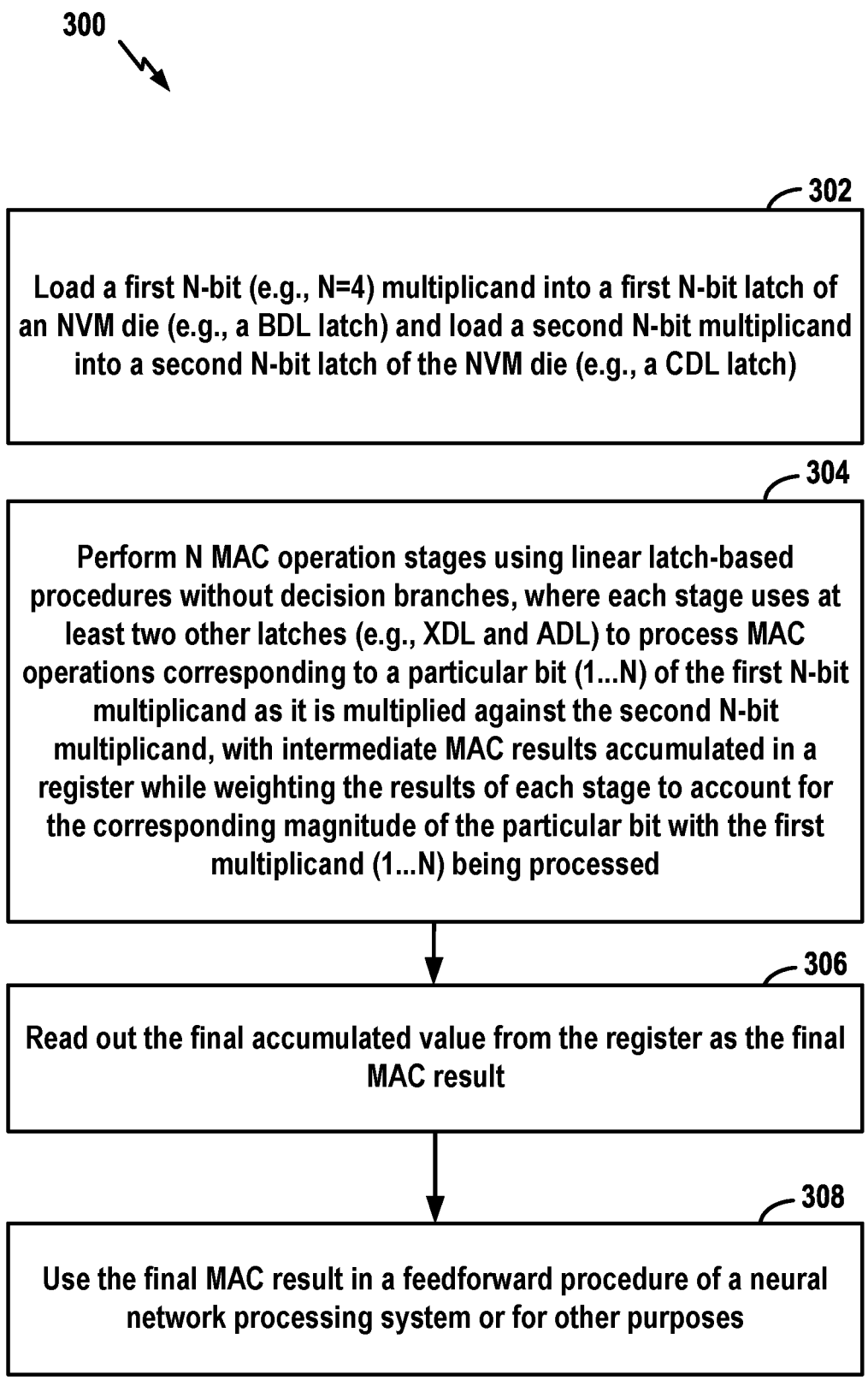
FIG. 3 is a flow chart of an exemplary latch-based method according to aspects of the present disclosure for performing a neural network MAC operation.

FIG. 3 summarizes some aspects of an illustrative procedure 300, which may be implemented by the control circuit 210 and other components of the NVM die 200 of FIG. 2 using the latches 208 and the register 209 of FIG. 2. Beginning at block 302, the control circuit 210 or other suitable component loads a first multi-bit or N-bit (e.g., N=4) multiplicand into a first N-bit latch of an NVM die (e.g., a BDL latch capable of storing at least N-bits) and loads a second multi-bit or N-bit multiplicand into a second N-bit latch of the NVM die (e.g., a CDL latch capable of storing at least N-bits). In the examples above, the second multiplicand is ABCD and the first multiplicand is EFGH (though, of course, the names of the multiplicands and the latches is arbitrary). In neural network processing examples, one of the multiplicands may be a neural network weight (w) and the other multiplicand may be a corresponding activation value (a).

At block 304, the control circuit 210 performs N MAC operation stages using linear latch-based procedures, e.g., without decision branches, where each stage uses at least two other latches (e.g., XDL and ADL) to process MAC operations corresponding to a particular bit (1 . . . N) of the first N-bit multiplicand (e.g., EFGH) as it is multiplied against the second N-bit multiplicand (e.g., ABCD), with intermediate MAC results accumulated in a register while weighting the results of each stage to account for the corresponding magnitude of the particular bit with the first multiplicand (1 ... N) being processed. Note that each stage of the N stages comprises at least N shift operations performed to fill at least one of the latches (e.g., XDL) with a copy of a particular one of the bits of the first N-bit multiplicand (e.g., to fill the XDL latch to all H's during a first stage, all G's during a second stage, and so on). At block 306, the control circuit 210 reads out the final accumulated value from the register as the final MAC result and, at block 308, the control circuit 210 (or other suitable processing components) use the final MAC result in a feedforward procedure of a neural network processing system along with other MAC results computed from other neural network weight multiplicands, or uses the result for other purposes.

Although described primarily with reference to examples where both multiplicands are N-bit numbers, in other examples, one multiplicand may be N-bit and the other may be M-bit, where N is different from M. The linear latch-based MAC procedures described herein may be modified, as appropriate, for use with that more general case. Also, as noted above, although the primary examples herein perform the processing without decision branches, at least some decisions may be incorporated into the process flow in at least some embodiments. The use of some logic decisions during the process flow can, depending upon the implementation, reduce firmware and/or NVM logic circuit overhead, especially for repeated branches without significantly slowing down processing. Still further, the examples herein are primarily directed to full page operations. In other examples, non-full page processing may be performed by, e.g., masking off part of the latches by ANDing the data with 0×00 to selectively exclude certain types of data. Examples of such data to exclude are ECC protection bytes, metadata headers, or data that is not part of a particular MAC operation but is stored in a larger array. Moreover, it should be understood that, in some embodiments, the MAC operations can accumulate beyond one set of latch operations for large collections of MAC operations that exceed a page.

Figure 4:
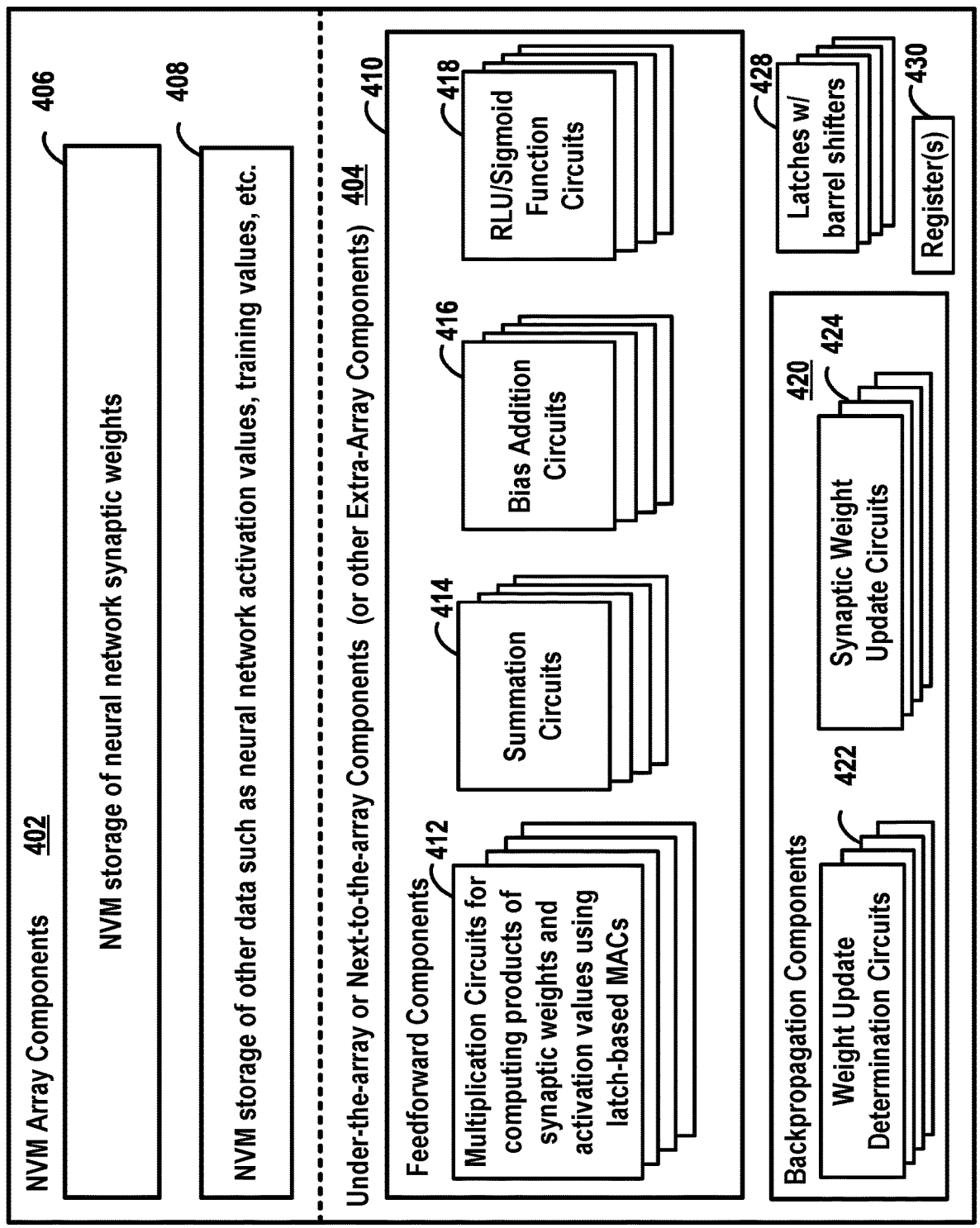
FIG. 4 illustrates an example of an NVM die having feedforward and backpropagation processing components for neural network processing, as wells as circuits and latches for performing latch-based neural network MAC operations, according to aspects of the present disclosure.

FIG. 4 illustrates a block diagram of an exemplary NVM die 400 that includes NVM storage array components 402 and under-the-array or next-to-the-array (or other extra-array) processing components 404 (processing components 404). (Noted that not all circuit or memory components that might be used in a practical NVM die are illustrated in the figure, such as input and output components, voltage regulation components, clocks and timing components, etc. Rather only some components and circuits are shown, summarized as block or schematic diagrams.) The NVM array components 402 include NVM storage 406 configured for storing neural network synaptic weights and NVM storage 408 configured for storing other data such as neural network bias values, training values, etc. Note that the data stored in NVM storage 408 may include non-neural network related data.

The NVM processing components 404 include feedforward components 410 configured to perform feedforward neural network operations, such as computing values in accordance with Equation 1, above. In the example of FIG. 4, the feedforward components 410 include: a set of multiplication circuits 412 configured to operate in parallel to compute the products of synaptic weights and activation values (as in, e.g., Equation 1) using latch-based MACs that use linear processing flow, e.g., without decision branches; a set of summation circuits 414 configured to operate in parallel to sum such products (as in, e.g., Equation 1); a set of bias addition circuits 416 configured to operate in parallel to add bias values to the sums (as in, e.g., Equation 1); and a set of RLU/sigmoid function circuits 418, configured to operate in parallel to compute RLU or sigmoid functions of the resulting values (as in, e.g., Equation 1). It is noted that the RLU function is more typically used within deep neural networks currently, as opposed to a sigmoid. In FIG. 4, only four instances of each of the aforementioned feedforward circuits are shown; however, it should be understood that far more circuits can be configured in parallel with, e.g., separate circuits provided for each of the N layers of a neural network (where this usage of "N" should not be confused with the N-bits and N stages discussed above). A set of latches with barrel shifters 428 and one or more register(s) 430 may be used by the multiplication circuits 412 (or other components).

The NVM processing components 404 also include backpropagation components 420 configured to perform backpropagation neural network operations, such as to compute values in accordance with Equations 5-8, above. In the example of FIG. 4, the backpropagation components 420 include: a set of weight update determination circuits 422 configured to operate in parallel to compute updates to the synaptic weights (as in, e.g., Equations 5-8) and a set of synaptic weight update circuits 424 configured to operate in parallel to update the synaptic weights stored in NVM storage 406 using the updates computed by circuit 422. As with the feedforward circuits, only four instances of each of the backpropagation circuits 422 and 424 are shown; however, it should be understood that more circuits can be configured in parallel with, e.g., separate circuits provided for each of the N layers of a neural network.

The feedforward operations and backpropagation operations may be performed iteratively or sequentially using the various weight and bias values of a neural network stored in the NVM array 402, as well as activation values or training values input from an SSD. Initially, default values for the synaptic weights and biases may be input and stored in the NVM array 402. For the purposes of the following descriptions, it is assumed that a set of weights and biases are already stored for use. In an illustrative example, to perform feedforward computations in accordance with Equation 1, a current set of synaptic weights w for the neurons of the first layer of the neural network are sensed from NVM storage 406. The multiplication circuits 412 and the summation circuits 414 may include various components arranged in parallel to multiply individual synaptic weights w with the corresponding activation values a and then sum the results for all of the neurons of the network. Bias values b are sensed from NVM storage 408 and added to the output of the summation circuit 414 using the bias addition circuits 416. Once the biases have been added, the sigmoid function (or RLU) for each result is then computed using the sigmoid/RLU function circuits 418 to yield resulting activation values (e.g., the activation $a^l_d$ of a $j^{th}$ neuron in the next layer). These operations proceed layer by layer until each of the layers of the neural network has been processed and a final result calculated, which may be output to the SSD or host.

For backpropagation, synaptic weights and other values (such as bias values) are sensed from the NVM array 402. Values corresponding to the aforementioned desired or known outputs/training values (e.g., $y=y(x)$) for the neural network may be input from the host. The weight update determination circuits 422 then perform the computations of Equations 5-8, above, to generate updates to the synaptic weights. The updates are applied to the stored synaptic weights of NVM storage 406 by update circuits 424. Once a full series of neural network computations have been completed, such as a full set of feedforward computations to generate a final output result, or a full set of backpropagation computations to update the synaptic weights, a suitable notification signal or indicator value may be sent to the SSD controller using an output component (not shown in FIG. 4).

Note that the MAC operations described herein need not be performed as part of feedforward processing but may be performed in other systems where MAC operations are useful. In some examples, a MAC command might be specified for use by a data storage controller to instruct an NVM die to perform an on-chip MAC using the latch-based devices and procedures described herein. Also, although linear latch-based procedures are described herein that do not use decision branches, some implementations may additionally have decision logic provided on the NVM die, such as within a microcontroller unit (MCU).

Insofar as performance is concerned, in an example where 5 μs is required per each of 125 operations, with four planes, 16 KB per latch set, and four bits per multiplicand, each MAC operation likely takes only 4.77 nanoseconds (ns) on the average (by taking advantage of the massive parallel processing permitted within such a device). This is on the order of the time needed just to output the data from a NVM NAND die to a data storage controller. Hence, performing the MAC operations on the NVM die is expected to be far more efficient than sending the data to a data storage controller for performing the MAC operations. This is, of course, depends on the number of bits. Also note that, generally speaking, with the more latches, fewer operations are needed. Overall processing speeds can be further enhanced within systems where the MAC operations can be distributed over many drives where each drive may have hundreds of NVM dies. Implementations using CMOS beneath array (CBA) technology may be capable of particularly high processing speeds.

In the following, various general exemplary procedures and systems are described.

Exemplary Data Storage Device Die

Figure 5:
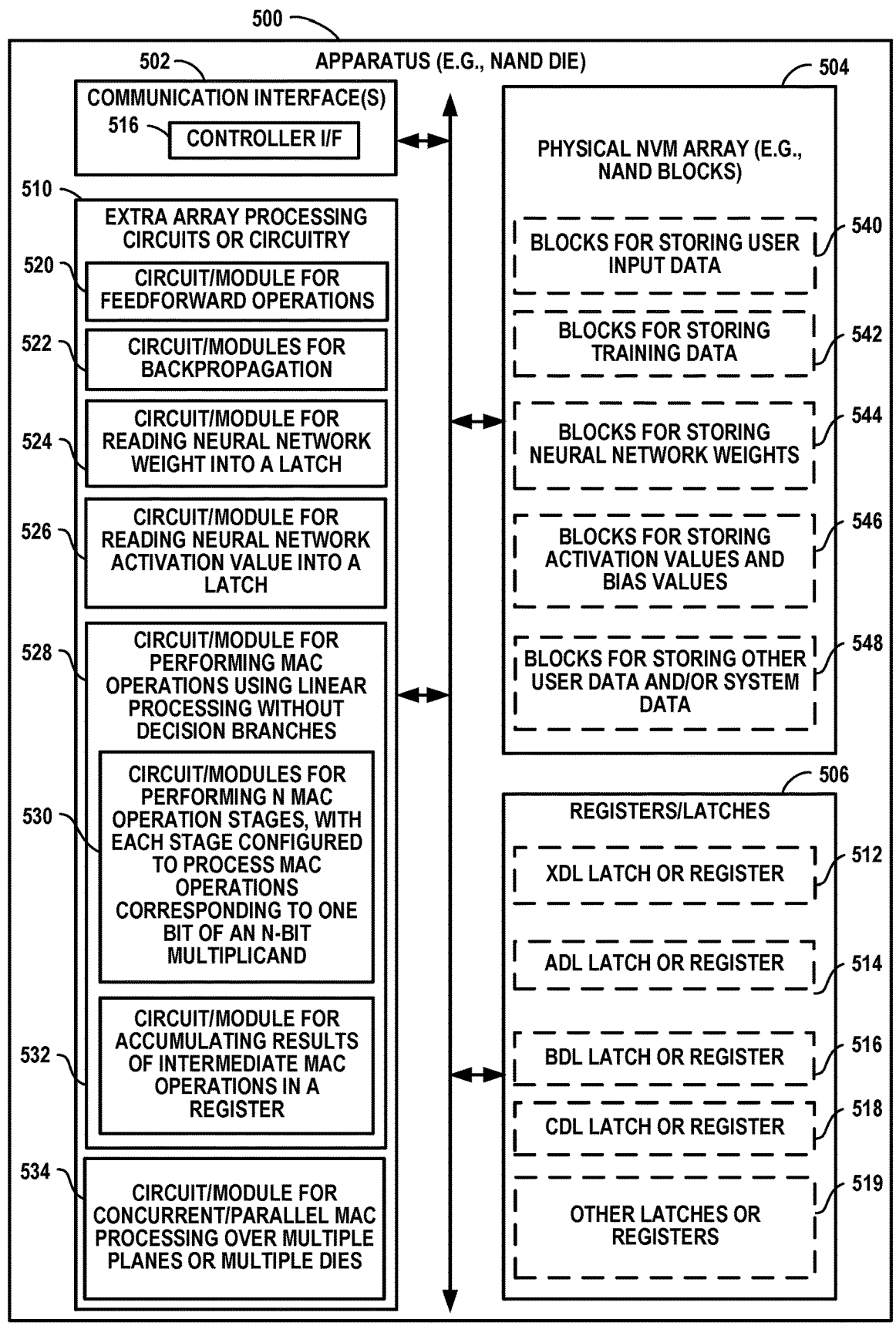
FIG. 5 is a schematic block diagram configuration for an exemplary NVM apparatus such as a NAND die having circuits and latches for performing latch-based neural network MAC operations, according to aspects of the present disclosure.

FIG. 5 illustrates an embodiment of an apparatus 500 configured according to one or more aspects of the disclosure. The apparatus 500, or components thereof, could embody or be implemented within a NAND die or some other type of NVM device that supports data storage. In various implementations, the apparatus 500, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes or uses neural network data. (In some aspects, the apparatus is instead a volatile memory chip with a volatile memory data storage array, and the data is not necessarily neural network weight but other types of data.)

The apparatus 500 includes a communication interface 502, a physical memory array (e.g., NAND blocks) 504, a set of registers and/or latches 506, and extra-array processing circuits or circuitry 510 (e.g., circuitry formed on the same die that includes the NVM array). These components can be coupled to and/or placed in electrical communication with one another via suitable components, represented generally by the connection lines in FIG. 5. Although not shown, other circuits such as timing sources, peripherals, voltage regulators, and power management circuits may be provided, which are well known in the art, and therefore, will not be described any further.

The communication interface 502 provides a means for communicating with other apparatuses over a transmission medium. In some implementations, the communication interface 502 includes circuitry and/or programming (e.g., a program) adapted to facilitate the communication of information bi-directionally with respect to one or more devices in a system. In some implementations, the communication interface 502 may be configured for wire-based communication. For example, the communication interface 502 could be a bus interface, a send/receive interface, or some other type of signal interface including circuitry for outputting and/or obtaining signals (e.g., outputting signal from and/or receiving signals into an SSD). The communication interface 502 serves as one example of a means for receiving and/or a means for transmitting.

The physical memory array 504 may represent one or more NAND blocks. The physical memory array 504 may be used for storing data such as neural network weights (or synaptic weights) that are manipulated by the processing circuits 510 or some other component of the apparatus 500. The physical memory array 504 may be coupled to the processing circuits 510 (via, e.g., registers/latches 506) such that the processing circuits 510 can read or sense information from, and write or program information to, the physical memory array 504 (via, e.g., registers/latches 506). That is, the physical memory array 504 can be coupled to the processing circuits 510 so that the physical memory array 504 is accessible by the processing circuits 510. The registers/latches 506 may include one or more of: an XDL latch 512; an ADL latch 514; a BDL latch 516; a CDL latch 518, and one or more other latches or registers 519, such as a sensing latch, SEN. The NVM array 504 may include one or more of: blocks 540 for storing user input data; blocks 542 for storing training data; blocks 544 for storing neural network weights; blocks 546 for storing activation values and bias values; and blocks 548 for storing other user data and/or system data.

The processing circuits 510 are arranged or configured to obtain, process and/or send data, control data access and storage, issue or respond to commands, and control other desired operations. For example, the processing circuits 510 may be implemented as one or more processors, one or more controllers, and/or other structures configured to perform functions.

According to one or more aspects of the disclosure, the processing circuits 510 may be adapted to perform any or all of the features, processes, functions, operations and/or routines described herein. For example, the processing circuits 510 may be configured to perform any of the steps, functions, and/or processes described with respect to FIG. 3 and FIG. 10 (described below). As used herein, the term "adapted" in relation to the processing circuit 510 may refer to the processing circuits 510 being one or more of configured, employed, implemented, and/or programmed to perform a particular process, function, operation and/or routine according to various features described herein. The processing circuits 510 may include a specialized processor, such as an application specific integrated circuit (ASIC) that serves as a means for (e.g., structure for) carrying out any one of the operations described in conjunction with FIG. 3 and FIG. 10. The processing circuits 510 serves as one example of a means for processing. In various implementations, the processing circuits 510 may provide and/or incorporate, at least in part, the functionality described above for the processing components of FIGS. 2 and 4 and FIGS. 6-9, described below.

According to at least one example of the apparatus 500, the processing circuitry 510 may include one or more of: a circuit/module 520 configured for performing feedforward neural network processing operations; a circuit/module 522 configured for performing backpropagation neural network processing operations; a circuit/module 524 configured for reading a neural network weight (or other multiplicand) from the NVM array 504 into a latch (such as into the BDL latch 516); a circuit/module 526 configured for reading a neural network activation value (or other multiplicand) from the NVM array 504 into a latch (such as into the CDL latch 518); a circuit/module 528 configured for controlling or performing MAC operations using linear processing, e.g., without decision branches; a circuit/module 530 configured for performing N MAC operation stages, with each stage configured to process MAC operations corresponding to one bit of an N-bit multiplicand; a circuit/module 532 configured for accumulating results of intermediate MAC operations in a register (such as register 519) so as to store a final result of a MAC operation in the register; and a circuit/module 534 configured for controlling concurrent/parallel MAC processing over multiple planes or multiple dies (e.g., the circuitry is configured to coordinate the concurrent and/or parallel processing of neural network MAC operations across multiple planes or multiple dies, if such coordination is needed).

In at least some examples, means may be provided for performing the functions illustrated in FIG. 5 and/or other functions illustrated or described herein. For example, the means may include one or more of: means, such as circuit/module 520, for performing feedforward neural network processing operations; means, such as circuit/module 522, for performing backpropagation neural network processing operations; means, such as circuit/module 524, for reading a neural network weight (or other multiplicand) from the NVM array 504 into a latch (such as into the BDL latch 516); means, such as circuit/module 526, configured for reading a neural network activation value (or other multiplicand) from the NVM array 504 into a latch (such as into the CDL latch 518); means, such as circuit/module 528, for controlling or performing MAC operations using linear processing, e.g., without decision branches; means, such as circuit/module 530, for performing N MAC operation stages, with each stage configured to process MAC operations corresponding to one bit of an N-bit multiplicand; means, such as circuit/module 532, for accumulating results of intermediate MAC operations in a register (such as register 519) so as to store a final result of a MAC operation in the register; and means, such as circuit/module 534, for concurrent/parallel MAC processing over multiple planes or multiple dies (e.g., for coordinating the concurrent and/or parallel processing of neural network MAC operations across multiple planes or multiple dies, if such coordination is needed).

Additional Exemplary Methods and Embodiments

Figure 6:
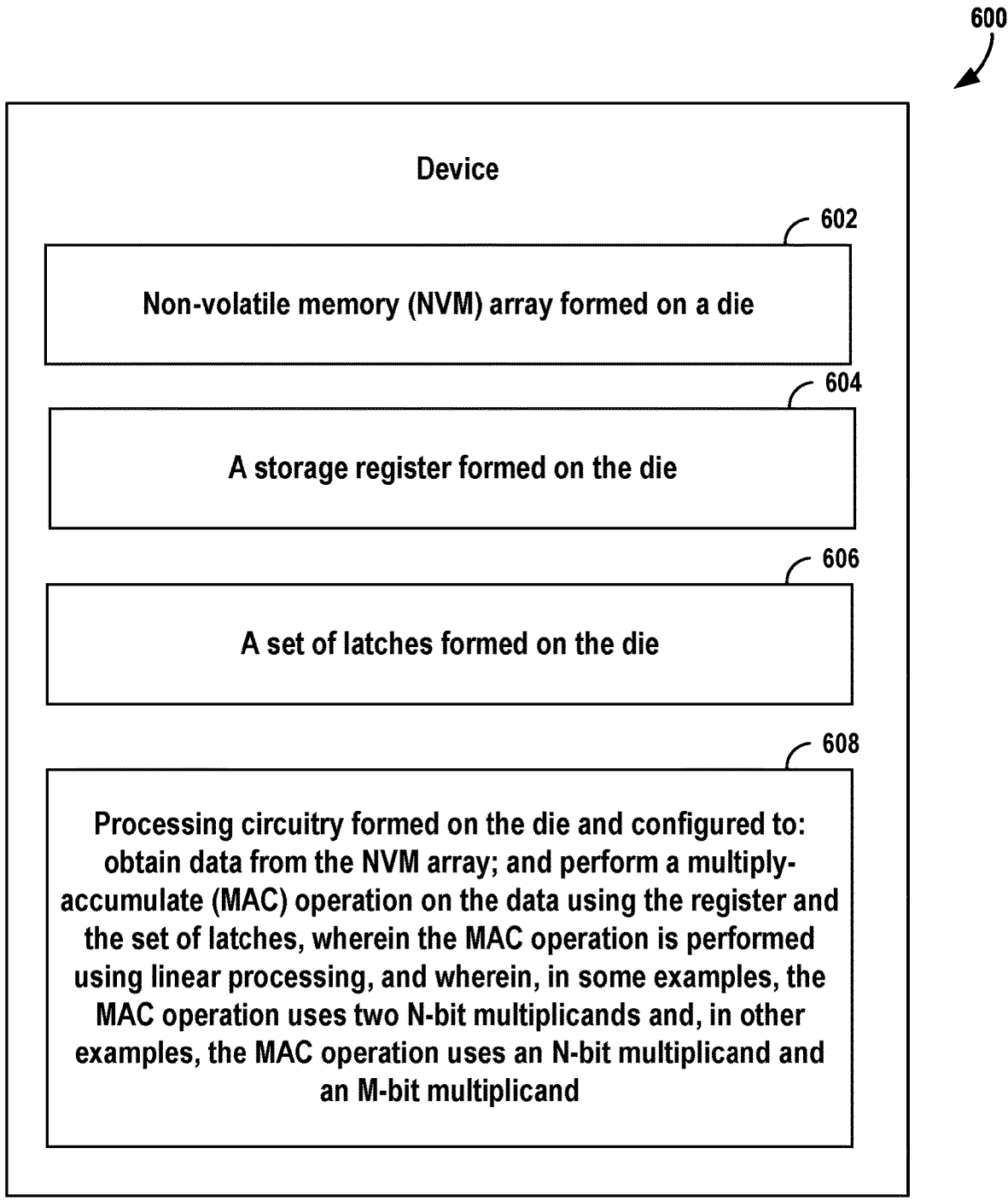
FIG. 6 is a block diagram illustrating an exemplary device according to aspects of the present disclosure.

FIG. 6 is a block diagram of a device 600 (which may be a data storage device) in accordance with some aspects of the disclosure. The device 600 includes an NVM array 602 formed on a die, a storage register 604 formed in the die, and a set of latches 606 formed on the die. The device 600 also includes a processing circuit or processing circuitry 608 formed on the die and configured to: obtain data from the NVM array; and perform a MAC operation on the data using the register and the set of latches, wherein the MAC operation is performed using linear processing, e.g., without decision branches. In some examples, the MAC operation uses two N-bit multiplicands and, in other examples, the MAC operation uses an N-bit and an M-bit multiplicand. See, for example, the devices of FIGS. 2, 4, and 5, described above.

Figure 7:
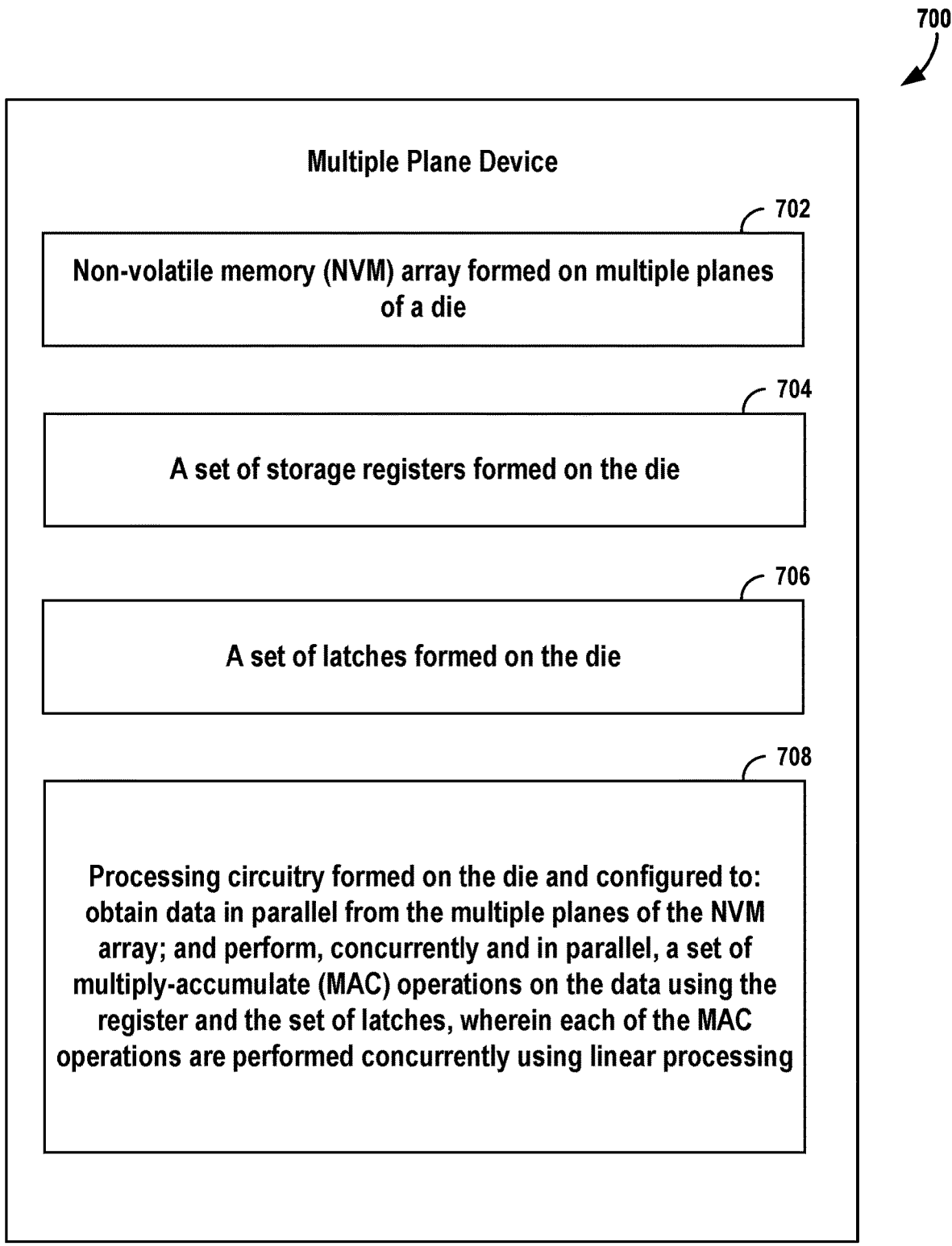
FIG. 7 is a block diagram illustrating an exemplary multiple plane device according to aspects of the present disclosure.

FIG. 7 is a block diagram of a multiple plane device 700 (which may be a data storage device) in accordance with some aspects of the disclosure. The device 700 includes an NVM array 702 formed on multiple planes of a die, a set of storage registers 704, and a set of latches 706 formed on the die. In some examples, each plane has a corresponding set of registers and set of latches. The device 700 also includes a processing circuit or processing circuitry 708 formed on the die and configured to: obtain data, concurrently and in parallel, from the multiple planes of the NVM array; and perform, concurrently and in parallel, a set of MAC operations on the data using the register(s) and the set(s) of latches, wherein each of the MAC operations are performed concurrently using linear processing, e.g., without decision branches.

Figure 8:
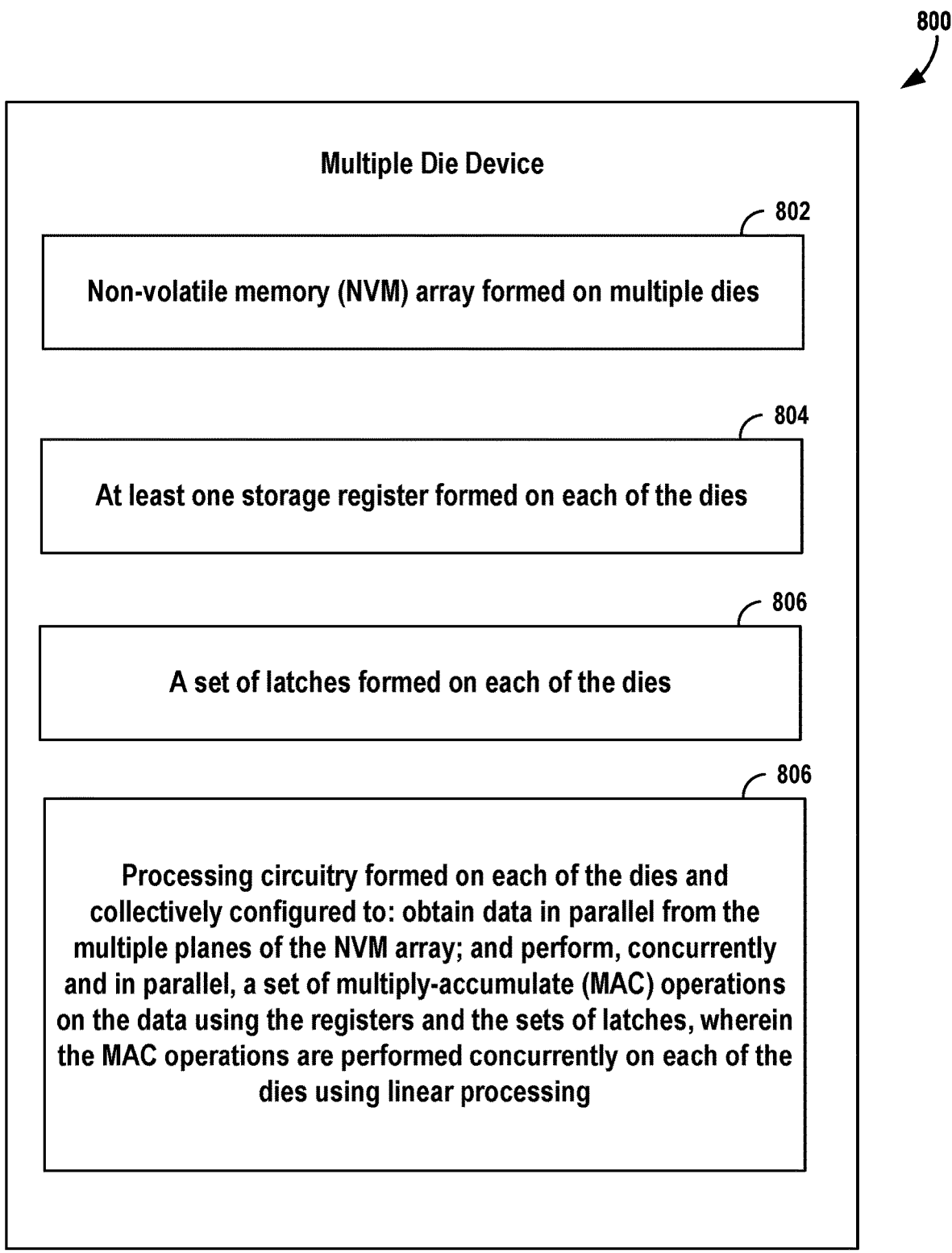
FIG. 8 is a block diagram illustrating an exemplary multiple die device according to aspects of the present disclosure.

FIG. 8 is a block diagram of a multiple die device 800 (which may be a data storage device) in accordance with some aspects of the disclosure. The device 800 includes an NVM array 802 formed on multiple dies, at least one storage register 804 formed on each of the dies, and a set of latches 806 formed on each of the dies. The device 800 also includes a processing circuit or processing circuitry 808 formed on each of the dies and configured to: obtain data, concurrently and in parallel, from the multiple dies of the NVM array; and perform, concurrently and in parallel, a set of MAC operations on the data using the registers and the sets of latches, wherein each of the MAC operations are performed concurrently on each of the dies using linear processing, e.g., without decision branches.

Figure 9:
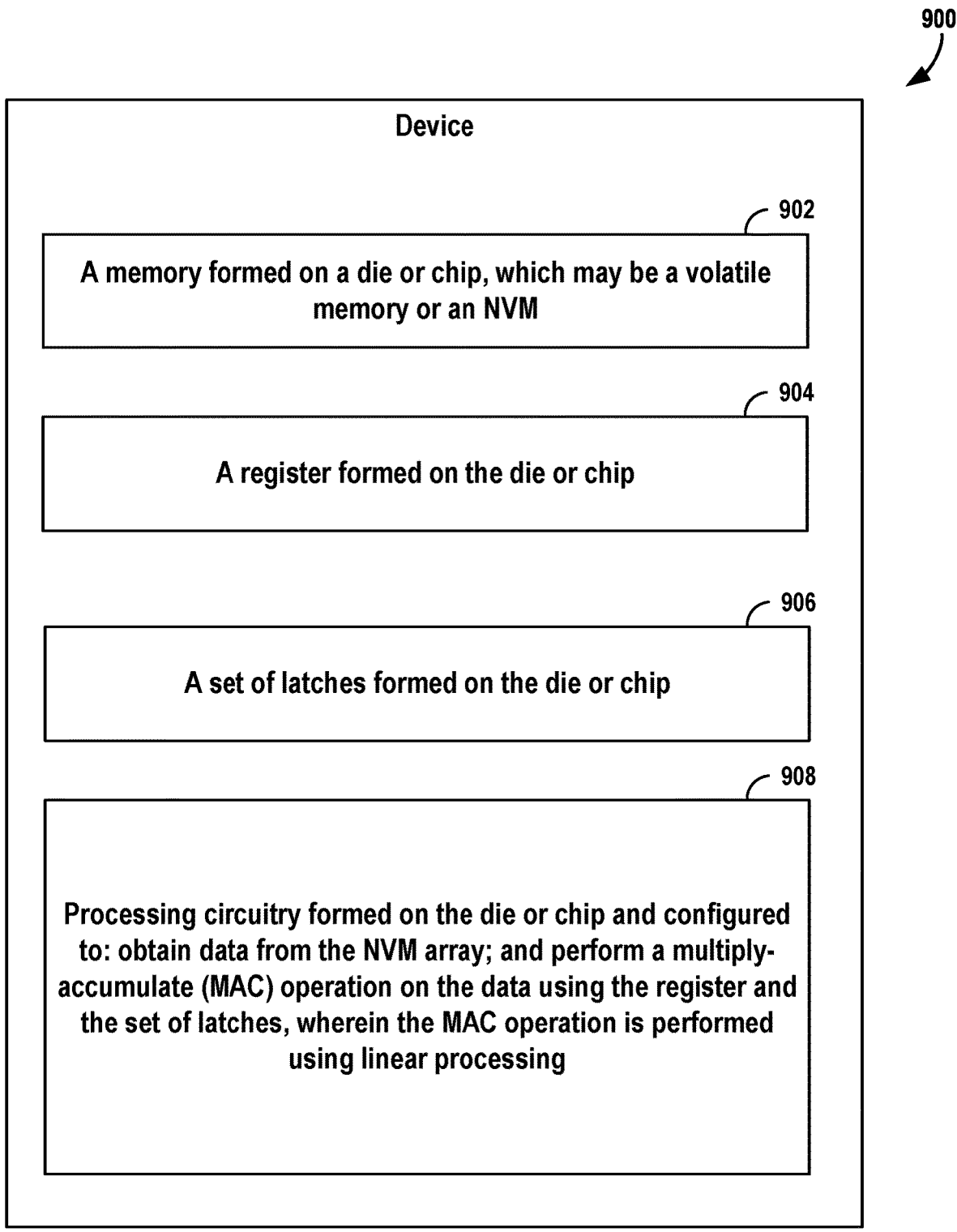
FIG. 9 is a block diagram illustrating another exemplary device according to aspects of the present disclosure.

FIG. 9 is a block diagram of a device 900 (which may be a data storage device) that includes a memory 902 formed on a die or chip, a register 904 formed on the die or chip, and a set of latches 906 formed on the die or chip. The memory may be a volatile memory or an NVM. The device 900 also includes a processing circuit or processing circuitry 908 formed on the die or chip and configured to: obtain data from the NVM array; and perform a MAC operation on the data using the register and the set of latches, wherein the MAC operation is performed using linear processing, e.g., without decision branches.

Figure 10:
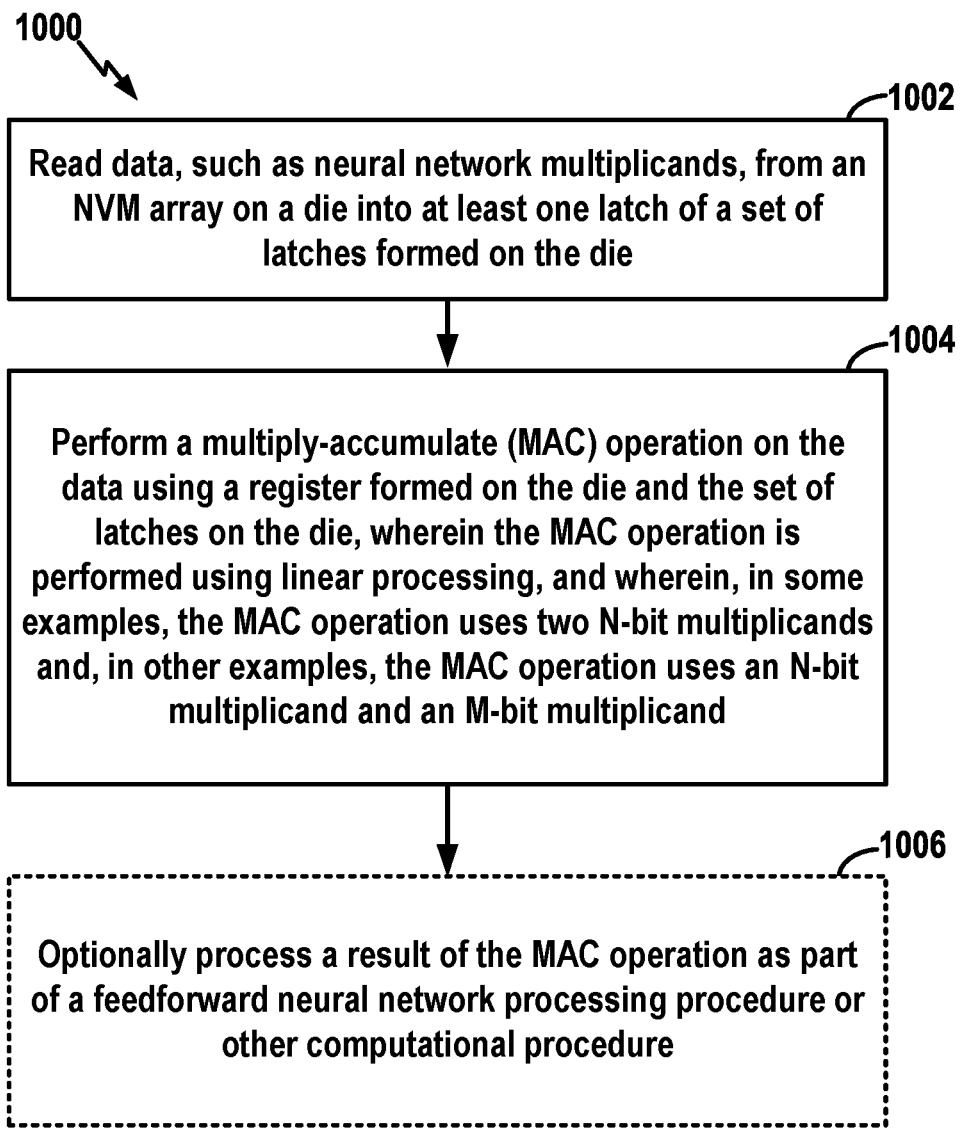
FIG. 10 is a flow chart of an exemplary method according to aspects of the present disclosure.

FIG. 10 illustrates a method or process 1000 in accordance with some aspects of the disclosure. The process 1000 may take place within any suitable device (which may be a data storage device) or apparatus capable of performing the operations, such as a NAND die configured with, a register, latches and appropriate processing circuitry. See, for example, the devices of FIGS. 2, 4, and 5, described above. At block 1002, the device reads data, such as neural network multiplicands, from an NVM array on a die into at least one latch of a set of latches formed on the die. At block 1004, the device performs a MAC operation on the data using a register formed on the die and the set of latches on the die, wherein the MAC operation is performed using linear processing, e.g., without decision branches. In some examples, the MAC operation uses two N-bit multiplicands and, in other examples, the MAC operation uses an N-bit and an M-bit multiplicand. At block 1006, the device optionally processes a result of the MAC operation as part of a feedforward neural network processing procedure or other computational procedure. See, for example, the method of FIG. 3, described above.

In at least some examples, means may be provided for performing the functions illustrated in FIG. 10 and/or other functions illustrated or described herein. For example, the means may include one or more of: means, such as circuit/modules 524 and 526 of FIG. 5, for reading data, such as neural network multiplicands, from an NVM array on a die into at least one latch of a set of latches formed on the die; means, such as such as circuit/module 528 of FIG. 5, for performing a MAC operation on the data using a register formed on the die and the set of latches on the die, wherein the MAC operation is performed using linear processing, e.g., without decision branches; and means, such as circuit/module 520 of FIG. 5, for processing a result of the MAC operation as part of a feedforward neural network processing procedure or other computational procedure.

Additional Aspects

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration. See, also, 3D XPoint (3DXP)) memories. Each type of memory device may have different configurations. For example, flash memory devices may be configured in a NAND or a NOR configuration.

Regarding the application of the features described herein to other memories besides NAND: NOR, 3DXP, PCM, and ReRAM have page-based architectures and programming processes that usually require operations such as shifts, XORs, ANDs, etc. If such devices do not already have latches (or their equivalents), latches can be added to support the latch-based operations described herein. Note also that latches can have a small footprint relative to the size of a memory array as one latch can connect to many thousands of cells, and hence adding latches does not typically require much circuit space.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the z direction) with each column having multiple memory elements in each column. The columns may be arranged in a two dimensional configuration, e.g., in an x-y plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-y) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items.

As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A device, comprising:
a non-volatile memory (NVM) array formed on a die;
a storage register formed on the die;
a set of latches formed on the die; and
processing circuitry formed on the die and configured to:
 obtain data from the NVM array, and
 perform a multiply-accumulate (MAC) operation on the data using the storage register and the set of latches, wherein the processing circuitry is configured to perform the MAC operation by being further configured to execute a sequence of instructions that operates on the data using the storage register and the set of latches to generate a MAC result, the sequence of instructions having no decision branches.

2. The device of claim 1, wherein the set of latches comprises four latches.

3. The device of claim 1, wherein a first latch of the set of latches stores a first multiplicand, a second latch of the set of latches stores a second multiplicand, a third latch of the set of latches stores a first set of intermediate results, and wherein a fourth latch of the set of latches stores a second set of intermediate results.

4. The device of claim 1, wherein the set of latches comprises four data latches and a sense latch.

5. The device of claim 1, further comprising a barrel shifter coupled to at least one of the latches of the set of latches.

6. The device of claim 1, wherein the processing circuitry is further configured to accumulate intermediate results of the MAC operation in the storage register and to store a final result of the MAC operation in the storage register.

7. The device of claim 1, wherein the processing circuitry is further configured to perform the MAC operation by performing a plurality of MAC operation stages, wherein each stage is configured for processing MAC operations corresponding to one bit of a first multi-bit multiplicand that is to be multiplied against a second multi-bit multiplicand.

8. The device of claim 7, wherein the first and second multiplicands each comprise N bits, and wherein the processing circuitry is configured to perform the MAC operation by performing N MAC operation stages, wherein each stage of the N stages is configured for processing MAC operations corresponding to one bit of the first N-bit multiplicand.

9. The device of claim 8, wherein each stage of the N stages comprises at least N shift operations performed to fill at least one of the latches of the set of latches with a copy of a particular one of the bits of the first N-bit multiplicand.

10. The device of claim 1, wherein the NVM array comprises at least one of a NAND array, a NOR array, phase-change memory (PCM) array, magneto-resistive random access memory (MRAM) arrays, a resistive random access memory (ReRAM) array, or a 3D XPoint (3DXP)) array.

11. A multiple die apparatus comprising a plurality of the devices of claim 1, wherein the multiple die apparatus is configured to concurrently perform a plurality of the MAC operations in parallel on a plurality of dies.

12. A method for use with a device comprising a non-volatile memory (NVM) array formed on a die, the method comprising:
reading data from the NVM array into at least one latch of a plurality of latches formed on the die; and
perform a multiply-accumulate (MAC) operation on the data using a storage register formed on the die and the plurality of latches formed on the die, wherein the MAC operation is performed by executing a sequence of instructions that operates on the data using the storage register and the plurality of latches to generate a MAC result, the sequence of instructions having no decision branches.

13. The method of claim 12, wherein performing the MAC operation comprises accumulating intermediate results in the register and storing a final result in the register.

14. The method of claim 12, wherein performing the MAC operation comprises performing a plurality of MAC operation stages, wherein each stage processes MAC operations corresponding to one bit of a first multi-bit multiplicand that is to be multiplied against a second multi-bit multiplicand.

15. The method of claim 14, wherein the first and second multiplicands each comprise N bits, and performing the MAC operation further comprises performing N MAC operation stages, wherein each stage of the N stages comprises processing MAC operations corresponding to one bit of the first N-bit multiplicand.

16. The method of claim 15, wherein each stage of the N stages comprises at least N shift operations performed to fill at least one of the latches with a copy of a particular one of the bits of the first N-bit multiplicand.

17. The method of claim 12, wherein the data comprises neural network data.

18. The method of claim 12 for use in a multiple die apparatus comprising a plurality of the devices, wherein the method further comprises concurrently performing a plurality of the MAC operations in parallel on a plurality of dies.

19. A device, comprising:
a memory formed on a die;
a storage register formed on the die;
a set of latches formed on the die; and
processing circuitry formed on the die and configured to:
obtain data from the memory; and
perform a multiply-accumulate (MAC) operation on the data using the register and the set of latches, wherein the processing circuitry is configured to perform the MAC operation by being further configured to execute a sequence of instructions that operates on the data using the storage register and the set of latches to generate a MAC result, the sequence of instructions having no decision branches.

20. The device of claim 19, wherein the memory is a volatile memory.

21. An apparatus for use with a device comprising a non-volatile memory (NVM) array formed on a die, the apparatus comprising:
means for reading data from the NVM array into at least one latch of a plurality of latches formed on the die; and
means for performing a multiply-accumulate (MAC) operation on the data using a storage register formed on the die and the plurality of latches formed on the die, wherein the MAC operation is performed by executing a sequence of instructions that operates on the data using the storage register and the plurality of latches to generate a MAC result, the sequence of instructions having no decision branches.

22. The device of claim 1, wherein the processing circuitry is further configured to perform the MAC operation by being further configured to perform latch operations comprising each of: a LOAD operation, an OR operation, an AND operation, a SHIFT operation, a COUNT operation, an ADD operation, and a COPY operation.

23. The method of claim 13, wherein the performing the MAC operation consists of performing latch operations comprising each of: a LOAD operation, an OR operation, an AND operation, a SHIFT operation, a COUNT operation, an ADD operation, and a COPY operation.

24. The device of claim 19, wherein the processing circuitry is further configured to perform the MAC operation by being further configured to perform latch operations comprising each of: a LOAD operation, an OR operation, an AND operation, a SHIFT operation, a COUNT operation, an ADD operation, and a COPY operation.

* * * * *